US 10,147,041 B2

(12) United States Patent
Gao et al.

(10) Patent No.: US 10,147,041 B2
(45) Date of Patent: Dec. 4, 2018

(54) COMPATIBILITY PREDICTION BASED ON OBJECT ATTRIBUTES

(71) Applicant: Facebook, Inc., Menlo Park, CA (US)

(72) Inventors: Tianshi Gao, Fremont, CA (US); Shyamsundar Rajaram, San Francisco, CA (US); Stuart Michael Bowers, Menlo Park, CA (US); Mircea Grecu, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 475 days.

(21) Appl. No.: 14/799,517

(22) Filed: Jul. 14, 2015

(65) Prior Publication Data

US 2017/0017886 A1    Jan. 19, 2017

(51) Int. Cl.
*G06N 5/04* (2006.01)
*G06N 99/00* (2010.01)
*G06Q 30/02* (2012.01)

(52) U.S. Cl.
CPC ............ *G06N 5/04* (2013.01); *G06N 99/005* (2013.01); *G06Q 30/02* (2013.01)

(58) Field of Classification Search
CPC .... G06Q 30/02; G06Q 30/0241; G06Q 50/01; G06N 5/04; G06N 99/005; G06F 17/3053; G06F 17/30598
USPC .......................................................... 706/12
See application file for complete search history.

(56) References Cited

U.S. PATENT DOCUMENTS

| | | | |
|---|---|---|---|
| 9,135,559 B1 | 9/2015 | Szeto et al. | |
| 2009/0265290 A1* | 10/2009 | Ciaramita | G06N 3/08 706/12 |
| 2010/0179855 A1* | 7/2010 | Chen | G06Q 10/063 705/7.31 |
| 2012/0054040 A1* | 3/2012 | Bagherjeiran | G06Q 30/00 705/14.66 |
| 2013/0191372 A1* | 7/2013 | Lee | G06F 17/30958 707/722 |
| 2014/0108308 A1* | 4/2014 | Stout | G06N 3/08 706/12 |
| 2014/0337096 A1* | 11/2014 | Bilenko | G06N 99/005 705/7.31 |
| 2015/0106311 A1 | 4/2015 | Birdwell et al. | |
| 2015/0379426 A1* | 12/2015 | Steele | G06N 99/005 706/12 |

(Continued)

OTHER PUBLICATIONS

Demšar, Janez, et al. "Orange: data mining toolbox in Python." The Journal of Machine Learning Research 14.1 (2013): 2349-2353.

(Continued)

*Primary Examiner* — Dave Misir
(74) *Attorney, Agent, or Firm* — Fenwick & West LLP

(57) ABSTRACT

Some embodiments include a method of generating a compatibility score for a grouping of objects based on correlations between attributes of the objects. An example grouping is a pair of user and ad. The method may be implemented using a multi-threaded pipeline architecture that utilizes a learning model to compute the compatibility score. The learning model determines correlations between a first object's attributes (e.g., user's liked pages, user demographics, user's apps installed, pixels visited, etc.) and a second object's attributes (e.g., expressed or implied). Example expressed attributes can be targeting keywords; example implied attributes can be object IDs associated with the ad.

19 Claims, 13 Drawing Sheets

(56) References Cited

U.S. PATENT DOCUMENTS

| | | |
|---|---|---|
| 2016/0300156 A1 | 10/2016 | Bowers et al. |
| 2016/0358101 A1 | 12/2016 | Bowers et al. |
| 2016/0358102 A1 | 12/2016 | Bowers et al. |
| 2016/0358103 A1 | 12/2016 | Bowers et al. |
| 2017/0076198 A1 | 3/2017 | Bowers et al. |
| 2017/0124486 A1 | 5/2017 | Chan et al. |
| 2017/0124487 A1 | 5/2017 | Szeto et al. |
| 2018/0004835 A1 | 1/2018 | Piechowicz et al. |
| 2018/0004859 A1 | 1/2018 | Piechowicz et al. |
| 2018/0007145 A1 | 1/2018 | Piechowicz et al. |

OTHER PUBLICATIONS

Microsoft Azure, "Machine Learning: Powerful cloud-based predictive analytics." [website], [retrieved on Aug. 13, 2015]. Retrieved from the internet: http://azure.microsoft.com/en-us/services/machine-learning/, 2014, 6 Pages.

RapidMiner Studio Manual, 2014, [online], [retrieved on Aug. 13, 2015]. Retrieved from: <http://docs.rapidminer.com/downloads/RapidMiner-v6-user-manual.pdf>, 116 pages.

U.S. Appl. No. 14/684,041 by Bowers, S., et al., filed Apr. 10, 2015.
U.S. Appl. No. 14/732,501 by Bowers, S., et al., filed Jun. 5, 2015.
U.S. Appl. No. 14/732,509 by Bowers, S., et al., filed Jun. 5, 2015.
U.S. Appl. No. 14/732,513 by Bowers, S., et al., filed Jun. 5, 2015.
U.S. Appl. No. 14/851,336 by Jin, O., et al., filed Sep. 11, 2015.
U.S. Appl. No. 15/199,335 by Piechowicz, S., et al., filed Jun. 30, 2016.
U.S. Appl. No. 15/199,351 by Piechowicz, S., et al., filed Jun. 30, 2016.
U.S. Appl. No. 15/199,403 by Piechowicz, S., et al., filed Jun. 30, 2016.

Leroux et al. A Genetic Programming Problem Definition Language Code Generator for the EpochX Framework, Proceedings of the Companion Publication of the 2014 Annual Conference on Genetic and Evolutionary Computation, 2014, pp. 1149-1154.

Non-Final Office Action dated Oct. 13, 2017 for U.S. Appl. No. 14/684,041 by Bowers, S., et al., filed Apr. 10, 2015.

Non-Final Office Action dated Oct. 4, 2017 for U.S. Appl. No. 14/732,501 for Bowers, S. filed Jun. 5, 2016.

Non-Final Office Action dated Sep. 25, 2017 for U.S. Appl. No. 14/732,513 for Bowers, S. filed Jun. 5, 2016.

Niu, F. et al., "HOGWILD!: A Loc-free Approach to Parallelizing Stochastic Gradient Descent," Computer Sciences Department, University of Wisconsin-Madison, pp. 1-22, Jun. 2011.

* cited by examiner

900

901 Input $\vec{u}, \vec{v}, l$

902 Create training table ($\vec{u}$ STRING, $\vec{v}$ STRING, label STRING).

903 Shuffle data in training table.

904 Index model parameters based on data instances in training table.

905 Execute learning by analyzing each data instance in training table (e.g., computing gradient) to update a particular model parameter (e.g., particular weight).

906 Generate feature vectors based on training data.

907 Generate scoring function based on training data.

$$s(u, v) = (Uu)^T(Vv) + b_u^T u + b_v^T v$$

where U is a k x m parameter matrix
where V is a k x n parameter matrix
    where k is significantly smaller than m and n    (i.e., k << min {m,n})

where $b_u$ is a bias vector for $\vec{u}$
where $b_v$ is a bias vector for $\vec{v}$ 908 Normalize scoring function.

$$s(u, v) = 1/sqrt(N_u)\ 1/sqrt(N_v)\ (Uu)^T(Vv) + 1/sqrt(N_u)\ b_u^T u + 1/sqrt(N_v)\ b_v^T v$$

Let $N_u$ be the number of non-zero features in u.
Let $N_v$ be the number of non-zero features in v.

909 Generate Score.

910 Append score to model parameters to generate final score.

911 Generate Final Score

*FIG. 9*

COMPATIBILITY PREDICTION BASED ON OBJECT ATTRIBUTES

BACKGROUND

Various businesses rely on machine learning models to process large and complex data sets ("big data") to provide valuable services to their customers. For example, a social networking service may implement a social networking system to provide users with personalized or targeted services that utilize big data. "Big data" is a broad term referring to the use of predictive methods to extract values from large datasets, which are generally so complex that traditional data processing systems are often inadequate in providing relevant insights. For example, analysis of datasets can find new correlations, trends, patterns, categories, etc. between, e.g., a user and a product or service. Existing data processing systems generally utilize one-to-one mappings of attributes of the user and the product/service in their analysis. However, such methodologies do not allow for predictions of correlations, trends, patterns, or categories that are not explicitly expressed in the one-to-one mappings.

BRIEF DESCRIPTION OF THE DRAWINGS

FIG. 9 is a pseudo-code block illustrating a method of building the model to determine a compatibility score between two objects based on corresponding attributes of the objects.

Figure 1:
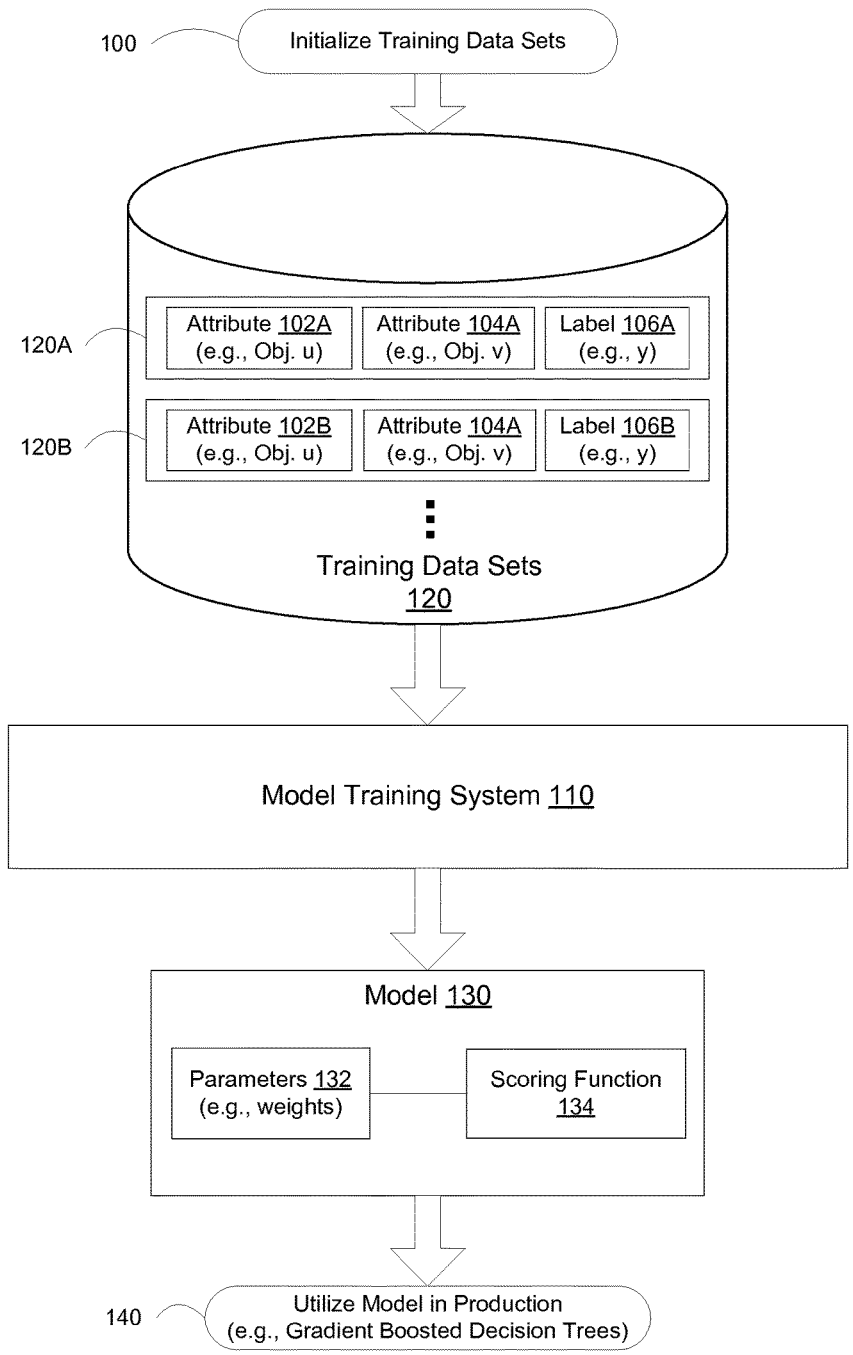
FIG. 1 is a data flow diagram of a model training system for computing a compatibility score for a grouping of objects based on attributes of the objects.

The figures depict various embodiments of this disclosure for purposes of illustration only. One skilled in the art will readily recognize from the following discussion that alternative embodiments of the structures and methods illustrated here may be employed without departing from the principles of embodiments described herein.

DETAILED DESCRIPTION

Disclosed are embodiments directed to a supervised learning process that combines decision trees with logistic regression to determine compatibilities between different groupings of objects. A computer server system having a multi-threaded pipeline architecture can be used to implement the process for computing a compatibility score of a grouping of two objects (i.e., a pair of objects). For example, based on training data, the learning process can attempt to learn a compatibility measure (i.e., a scoring function) $s(\vec{u}, \vec{v})$ between a "tuple" that is a pair of user u and advertisement (hereinafter, "ad") v with a targeted outcome y corresponding to the pair, by using training datasets $\{(\vec{u}_i, \vec{v}_i, y_i), i=1, \ldots N\}$, where $\vec{u}$ is an attribute feature vector of u with dimension m and $\vec{v}$ is an attribute feature vector of v with dimension n. Each attribute feature vector includes a vector of one or more attributes of a respective object (e.g., a user u or an ad v). For example, a user's attributes can be liked pages, user demographics, apps installed by the user, pixels visited, etc.; an ad's attributes can be, for example, expressed attributes, such as targeting keywords, or implied attributes, such as object IDs associated with promotional objects related to the ad. Under this simplification, the outcome y can be a binary variable $y \in \{-1, 1\}$ for a pair of user-ad (e.g., indicating a "click" or "no click"), or it can be a non-binary variable (i.e., real-valued) representative of a degree of correlation for the user-ad pair (e.g., $y \in \{1.2, 0.5,$ etc.$\}$). The learning process can attempt to learn a weight matrix w from the training data. In particular, the learning process outputs a dense representation of attributes of the two objects (as derived from the training data), and the weight matrix is the actual mathematical object for the dense representation. Note that the dense representation is a feature vector that is obtained such that the inner product is a meaningful score which measures the compatibility between the two objects (e.g., user and ad). The w is then used to compute the final compatibility score for the user-ad pair using a scoring function; that is, the scoring function is a function of the weight matrix. Further, the compatibility score can be used for ranking unknown data (e.g., a new pair of user and ad).

The multi-threaded pipeline architecture disclosed here is organized as a chained or pipelined sequence of stages, in which each stage has of a set of independent, but identical processors that execute in independent threads (i.e., parallel processing). The number of threads per stage can be varied, for example, to account for processing effort. The output of each stage may be written to a queue, and that output in turn serves as the input to the next stage. In some embodiments, the pipeline architecture includes a loader engine, a parser engine, a dictionary engine, a learning engine, and an evaluation engine. The loader engine can be, or include, a set of one or more Hive loader processors. A "loader" refers to a scanning component that recursively looks for and returns a list of all files matching a given type, e.g., data stored in an Apache Hive™ data warehouse that manages large datasets residing in distributed storage. The parser engine can be, or include, a set of one or more parser processors for parsing raw strings of data to an appropriate data structure representing training samples. The dictionary engine can be, or include, a set of one or more dictionary processors for mapping original feature representation (e.g., a targeting word associated with an ad) to a dense integer for more efficient processing in learning. The learning engine can be, or include, a set of one or more learner processors for performing stochastic gradient descent on the datasets to update weight values of w. The evaluation engine can be, or include, a set of one or more evaluation processors for computing and accumulating losses associated with the supervised learning process.

The output of the multi-threaded pipeline architecture is a feature vector, which is a short array of real numbers. Such an array of numbers is a "dense representation" of the raw attributes of the first object, e.g., user, (or the second object e.g., ad). The raw attributes, which have been the inputs to the multi-threaded pipeline architecture, are transformed into the dense representation (or feature vector) after the process implemented by the pipeline architecture. The term "dense representation" may be used interchangeably throughout the specification to refer to this feature vector. In particular, the multi-threaded pipeline architecture can produce two sets of dense representations: one set for the first object's attributes (e.g., the user's attributes) and one set for the second object's attributes (e.g., ad's attributes). A simple aggregation of the attributes (e.g., average) for the first object (e.g., user) can further be computed to obtain the dense representation of the first object; similarly, the aggregation of attributes for the second object can be computed to obtain the dense representation of the second object.

It is noted that the raw attributes, or input attribute vectors (e.g., $\vec{u}$ or $\vec{v}$) are each a high dimensional (e.g., millions of attributes) and sparse (e.g., hundreds of the million attributes having a value) vector (as opposed to the output vector, which is dense). These sparse attribute vectors are then transformed into latent feature vectors that are dense. As used here, a "feature vector" or a "latent vector" refers to a vector of a second object's attributes that are associated with a given attribute of a first object, where the second object's attributes are mapped to the first object's given attribute based on an analysis of the sparse attribute vectors of those two objects; that is, a given latent feature vector provides a profile for a given attribute present in each sparse attribute vector. By analyzing the training data, the learning process can attempt to learn a profile for every attribute in the sparse attribute vector of a first object and in the sparse attribute vector of a second object, respectively. For example, the learning process can learn a profile, or latent vector, of an age attribute "25" (i.e., age 25) of user u to include a target ID of a website "www. . . . funny.com" and a target keyword "sports cars"; that is, for a user of age 25, a prediction can be made that the user is likely interested in sports cars and interested in websites related to the funny.com website. In another example, a learned profile, or latent vector, of a liked page "climbing" can include "outdoors" target word and "hiking" target word; that is, a prediction can be made that a user who has liked a "climbing" page is likely interested in ads related to climbing and the outdoors. Such latent vector is a dense representation of the attributes of a respective object (e.g., user, ad, etc.).

Note that while the example discussed above refers to a user and an ad pair for illustrative purpose, the disclosed embodiments may be implemented to determine similarity, or correlations, between other types of objects. Examples of other objects can include a user of a social networking system and a page of the social networking system. In another example, the objects can include the user of the social networking system and an entity outside of the social networking system, e.g., a mobile application (hereinafter, "app"), conversion pixel(s), a website, a movie, a television show, an audio-streaming program, etc. In yet another example, the objects can include two products, e.g., a gaming app and an video-editing book.

Referring now to the figures, FIG. 1 is a data flow diagram of a model training system 110 for computing a compatibility score for a grouping of objects based on attributes of those objects, in accordance with some embodiments. The model learning system 110 can be implemented by a computer processor in a computer server system as configured by a set of executable instructions. Alternatively, the model learning system 110 can be implemented by application specific integrated circuit (ASIC), a programmable controller, a field programmable gate array (FPGA), or other electronic circuitry. The model learning system 110 can train a model 130, such as a supervised learning model, based on training data sets 120 of attributes of two objects to determine a level of compatibility, or matching, between the objects. The model learning system 110 can train the model 130 by using a "double helix" learning process that aims to accomplish the matching on two levels: (i) matching the two objects and (ii) matching respective attributes of those objects (e.g., finding a correlation between every pair of attributes). The double helix learning process attempts to first map an individual object to a set of attributes, then to map two individual objects (i.e., of different types) to one another based on their corresponding sets of attributes.

The model training system 110 can be instantiated as an active, multi-threaded pipelining computer process running on a computer server system (e.g., one or more computing devices) with suitable data structures to store the model 130 or the training data sets 120. The data structures can be instantiated on one or more memory devices of the computer system.

The training datasets 120 include data about each of the two objects being analyzed for compatibility, where each object is represented as a collection of attributes associated with the respective object. For example, a first object (e.g., "Obj. u") is represented by a collection of attributes 102, and a second object (e.g., "Obj. v") is represented by a collection of attributes 104. The training data sets 120 can be initialized, as indicated by block 100, to be encoded in a format that enables efficient processing by the model training system 110. Under the format, the training data sets 120 are presented as a table of training data, where a first column corresponds to the attributes 102 of the first object, a second column corresponds to the attributes 104 of the second object, and the third column corresponds to a label indicating a correlation between the first object and the second object. Each row of data in the formatted table is a training data instance, or individual data set of the training data sets 120. For example, the training data sets 110 can include individual datasets 120A and 120B, which are training instances that can be analyzed one at a time by the model training system 110. An individual dataset 110A can be a first training instance that includes an attribute 102A of the first object, an attribute 104A of the second object, and a label 106A. Similarly, the individual data set 120B, for example, can include an attribute 102B of the first object, an attribute 104B of the second object, and a label 106B. The label 106 can be a binary value $y \in \{-1,1\}$. For example, where Obj. u is a user and Obj. v is an ad, the label can be a "click" or "no click," a "conversion" or "no conversion," among others. In some embodiments, the label 106 can be a non-binary value, or real-valued, to indicate a degree of correlation (e.g., −1, 0, 1, 2, 5.1, etc.).

The model training system 110 can attempt to create parameters 132 for a scoring function 134 by using the training data sets 120, such that the scoring function 134 configured with the parameters 132 can accurately determine a compatibility score for the two objects. In some embodiments, the model training system 110 generates dense representations of objects, where the scoring function can rely on the dense representations to compute the compatibility score. The parameters 132 can be a set of weights, or weight matrix, that is the actual mathematical object for the dense representations. In other words, the scoring function is a function of the weight matrix. As will be discussed in further detail below, the output of the scoring function 134 can be used as an input feature for a boosted decision trees (BDT) analysis. The BDT analysis can combine such input feature with other features that come from other training models. In addition to using the output of the scoring function as an input feature to BDT, one can also directly use the raw dense representations (equal to weight matrix) as features in BDT.

In particular, the compatibility score can be appended onto each individual data set (e.g., 120A, 120B, etc.) to transform the training data sets 120 from a sparse representation into a dense representation of attributes of the two objects, where the sparse representation is part of the model 130. The scoring function 134 and the parameters 132 may be the basis of the model 130. The model training system 110 can then share the model 130 with, for example, a production engine for use in predicting compatibility with other objects, as indicated in block 140 (e.g., BDT).

The production engine can be implemented by a computer processor of the computer system as configured by a set of executable instructions. The production engine can be coupled to an interface that receives real-time training data of production events in the same feature space as the training data sets 120. The production engine can then utilize the model 130 along with production models (e.g., Gradient Boosted Decision Trees (GBDTs) to make estimations and/or predictions of potential objects that are compatible with inputs associated with the production events.

Figure 2:
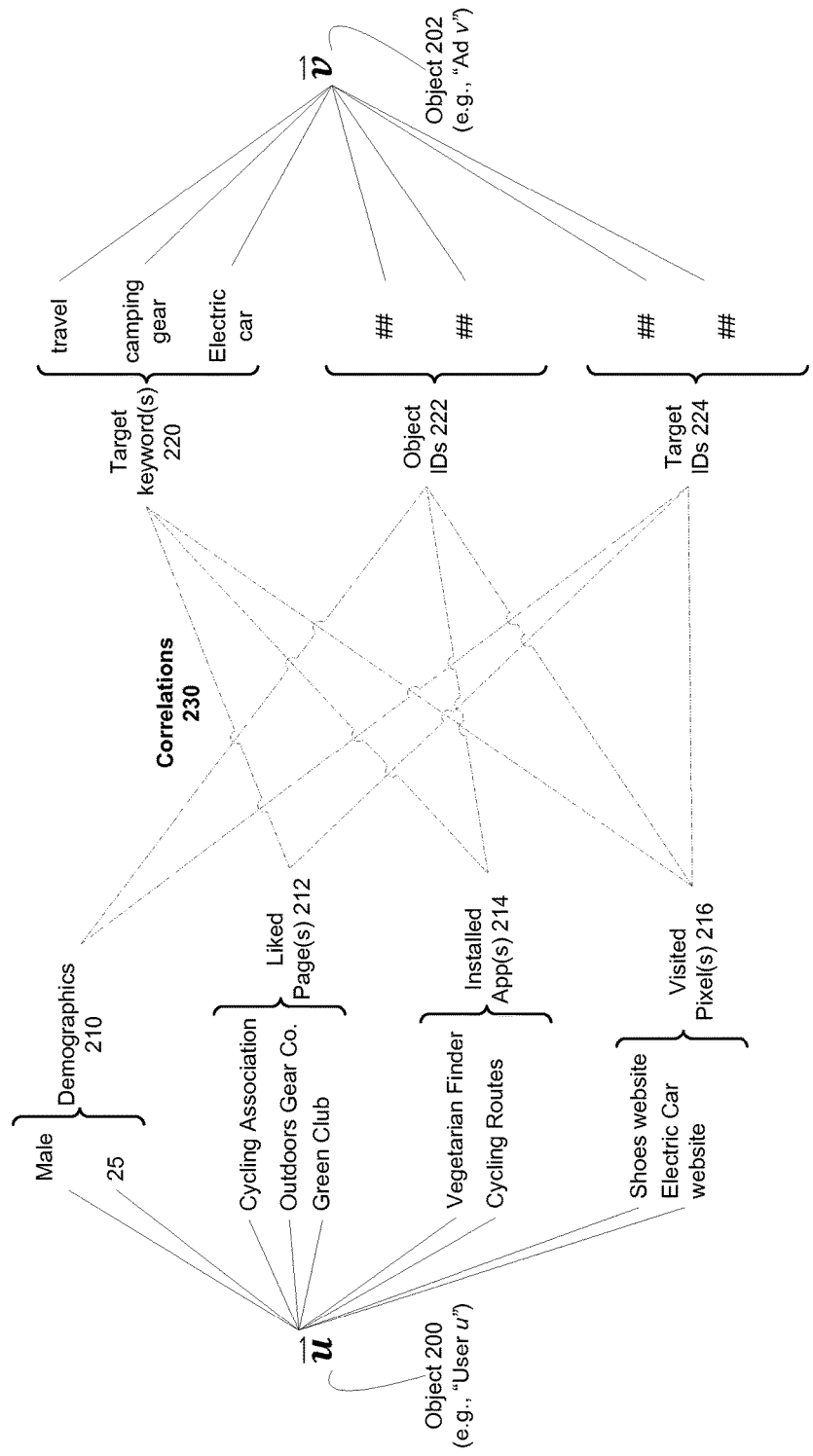
FIG. 2 is a data flow diagram illustrating a mapping of attributes between two example objects, in accordance with some embodiments of the disclosure.

FIG. 2 is a data flow diagram illustrating a mapping of attributes between two example objects, in accordance with some embodiments of the disclosure. In the illustrated example of FIG. 2, consider an example first object 200 of a user u and an example second object 202 of an ad v. User u (i.e., object 200) is represented as a vector of attributes (i.e., "attribute vector") denoted as $\vec{u}$ with dimension m, and ad v (i.e., object 202) is represented as an attribute vector denoted as $\vec{v}$ with dimension n. In particular, the attribute vector $\vec{u}$ is a sparse representation of the user u and the attribute vector $\vec{v}$ is a sparse representation of the ad v. A mapping of the attributes in the respective vectors of user u and ad v is illustrated in FIG. 2.

The attributes of $\vec{u}$ can include demographic attributes 210 and interest-based attributes of the user u. Demographic attributes 210 can include, for example, and age (e.g., 25) and a gender (e.g., male). Other demographic attributes 210 can include a geographical location, a hometown, education level, income level, marital status, relationship status, occupation, religion, political affiliation, race, ethnicity, nationality, etc. The interest-based attributes of the user u can include liked pages 212 (e.g., pages of a social networking system that the user u has liked in the past based on historical data), installed apps 214 (e.g., applications installed by the user in the past based on historical data), visited pixels 216, among others. The term "visited pixel" as used here refers to a mechanism embedded within a website that notifies a server whether a user has visited that website and/or otherwise interacted with the website, thereby enabling tracking of website visits and other types of user activity on the website. The attributes of $\vec{v}$ can include targeting keyword(s) 220, object IDs 222, and target IDs 224 associated with the ad v. Example object IDs can include a page ID or a mobile app install ID of the mobile app promoted by an ad. Example target IDs can include an ID of the website at which the ad V targets.

Existing systems typically look for one-to-one matching to determine whether two objects are compatible. For example, a user who is a male is typically matched with an ad targeting a male. In another example, a user who has just visited a car dealership website is matched with an ad promoting a car for sale. This one-to-one matching may work in some situations, but is not optimal. For example, the user may have already bought a car when visiting the car dealership website, and as such will likely ignore an ad attempting to sell the user another car.

In contrast to existing systems, the model training system disclosed here attempts to learn different types of connections, which are more than the mere one-to-one connections typically performed by existing systems. In particular, the model training system analyzes historical data about interactions between groups of attributes to learn a pairwise similarity between attributes from both sides (e.g., of the object 200 and the object 202) to map correlations 230 between the objects. Under the disclosed embodiments, a prediction can be made, for example, that the user in the example above will likely be more interested in car insurance or car service than buying another car, where such prediction can be made based on the determined correlations.

Referring back to FIG. 2, for example, the model training system can learn that the user u, who is male, is correlated to website X and object Y by analyzing data indicating that the user u has clicked on the ad v when it was targeting website X in one instance, and promoting object Y in another instance. Based on these example correlations, the model training system can make a prediction that another user, who is male, will likely be interested in an ad promoting object Y, even though that ad may not be targeting male users. This prediction may not be realized under the existing systems, which relies on the one-to-one mapping that does not recognize the implicit, or indirect, relationship between the ad promoting object Y and the male user.

As will be discussed in further details below, the model training system analyzes the sparse representations of the objects to transform them into dense representations, or latent vectors. The latent vectors can then be utilized with weight values to generate a compatibility score for the pair of objects. This compatibility score can be used to rank a set of potential second objects for a particular object. A compatible second object can be selected from the set of potential second objects for the particular object based on the ranking.

Figure 3:
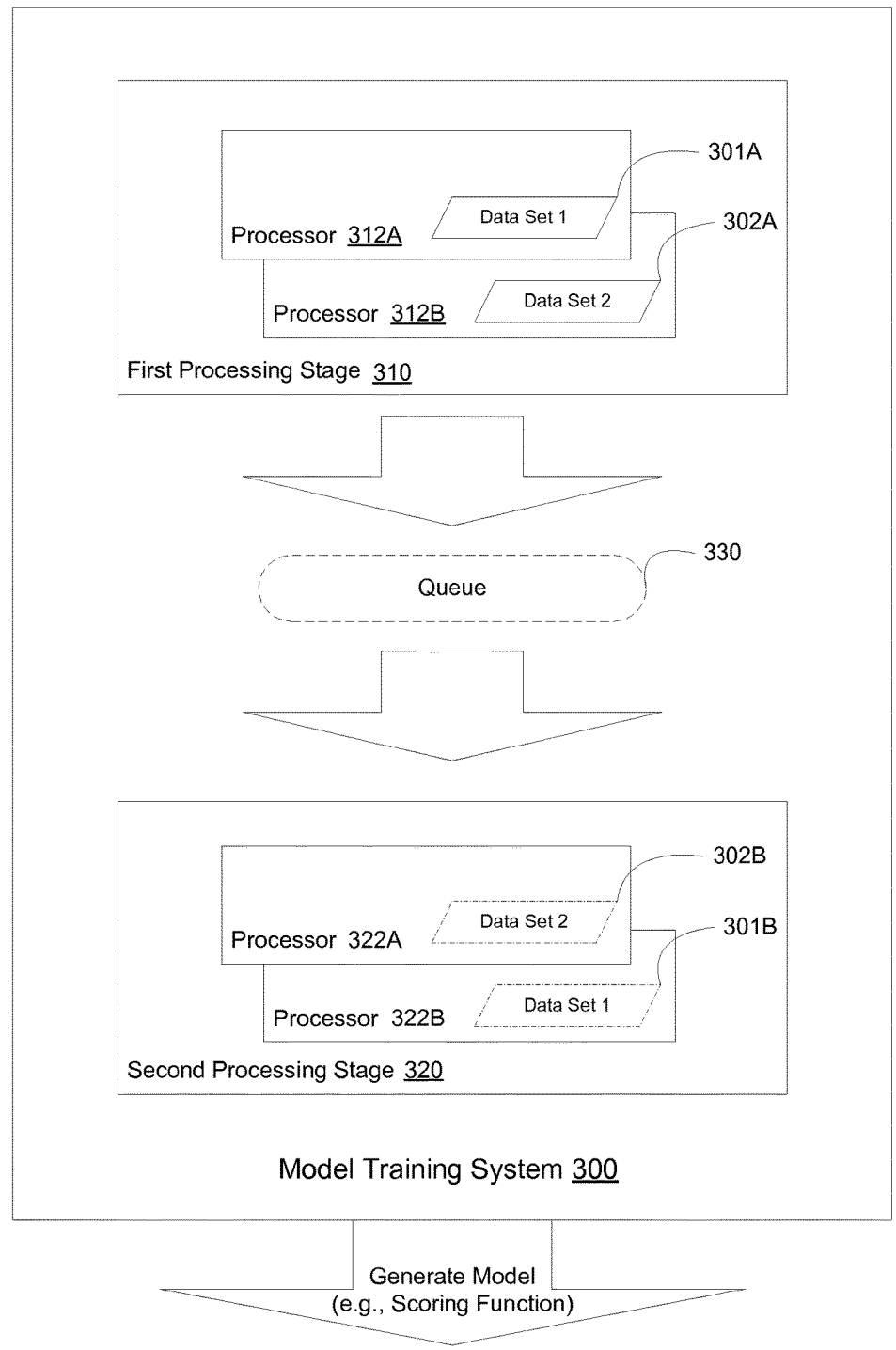
FIG. 3 is a block diagram illustrating processing stages of a model training system.

FIG. 3 is a block diagram illustrating processing stages of a model training system 300 (e.g., the model training system 110 of FIG. 1), in accordance with some embodiments. The model training system 300 can be implemented as a multi-threaded architecture that is organized as a chain of multiple processing stages. Two example processing stages, i.e., a first processing stage 310 and a second processing stage 320, are illustrated in the embodiments of FIG. 3. In other embodiments, any other number of processing stages may be implemented by the model training system 300.

In embodiments, an output of the first processing stage 310 serves as the input of the second processing stage 320. Each processing stage 310, 320 can include a set of independent, but identical processors, where each processor represents a processing thread. That is, each stage is capable of multi-threaded processing using the set of processors. The number of processors at each processing stage can be configurable. For example, a processing stage that typically requires intensive CPU usage can be configured to have a higher number of processors for enabling more processing threads. As illustrated in the embodiments of FIG. 3, the first processing stage 310 includes a set of processors 312A and 312B, and the second processing stage 320 includes a set of processors 322A and 322B.

At the first processing stage 310 of the model training system 300, the processor 312A can process a data set 301A (e.g., "data set 1") and the processor 312B can process a data set 302A, such that those datasets 301A, 302A can be processed in parallel. Upon completion of processing by any of the processors 312A, 312B, an output from that processor can be retrieved and processed by any processor of the second processing stage 320. For example, the processor 3126 may be done with processing the dataset 302A, and as such, passes that dataset to the second processing stage 320 for further processing. At the second processing stage 320, the processor 322A is not occupied, and as such, is able to process the output from the processor 3126. At a later time, upon completion, the processor 312A can pass its output (i.e., the resulting processed dataset 301A) to the second processing stage 320, where the processor 322B, which is not occupied, may retrieve and process that resulting dataset.

In some embodiments, the processing stages 310, 320 can be connected through "pipes." The term "pipe" as used here refers to a processing queue (e.g., queue 330) that can be instantiated on a memory device. For example, the first processing stage 310 may have a third processor (e.g., processor 312C) that enables processing of a third dataset (e.g., dataset 303A). The resulting dataset 303A from the third processor may get written to the queue 330 and wait to be retrieved by any one of the processors 322A, 322B when the processor is no longer occupied (e.g., has completed processing dataset 302A or 302B). In some embodiments, the queue 330 may reside within a particular processing stage and/or operatively coupled to a given processor, and is not limited to being separated from the particular processing stage and/or given processor (e.g., as that which is shown in the embodiments of FIG. 3). Upon completion of processing the data sets through the processing stages, the model training system 300 can generate a model that can be utilized in a production engine, as will be discussed in further details in FIG. 7.

Figure 4:
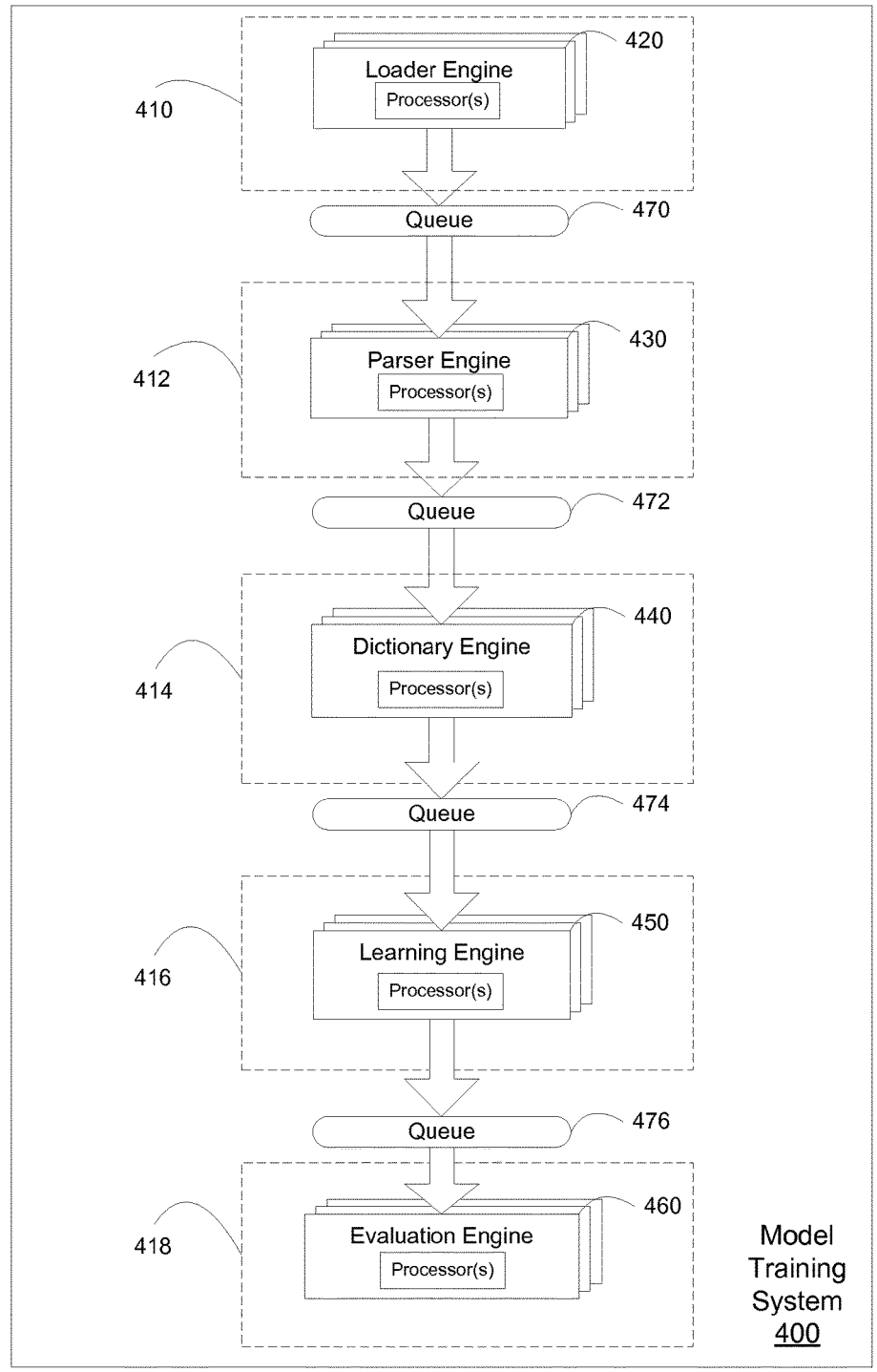
FIG. 4 is a block diagram illustrating sets of processors that can execute processes in one or more processing stages of the model training system.
Figure 5:
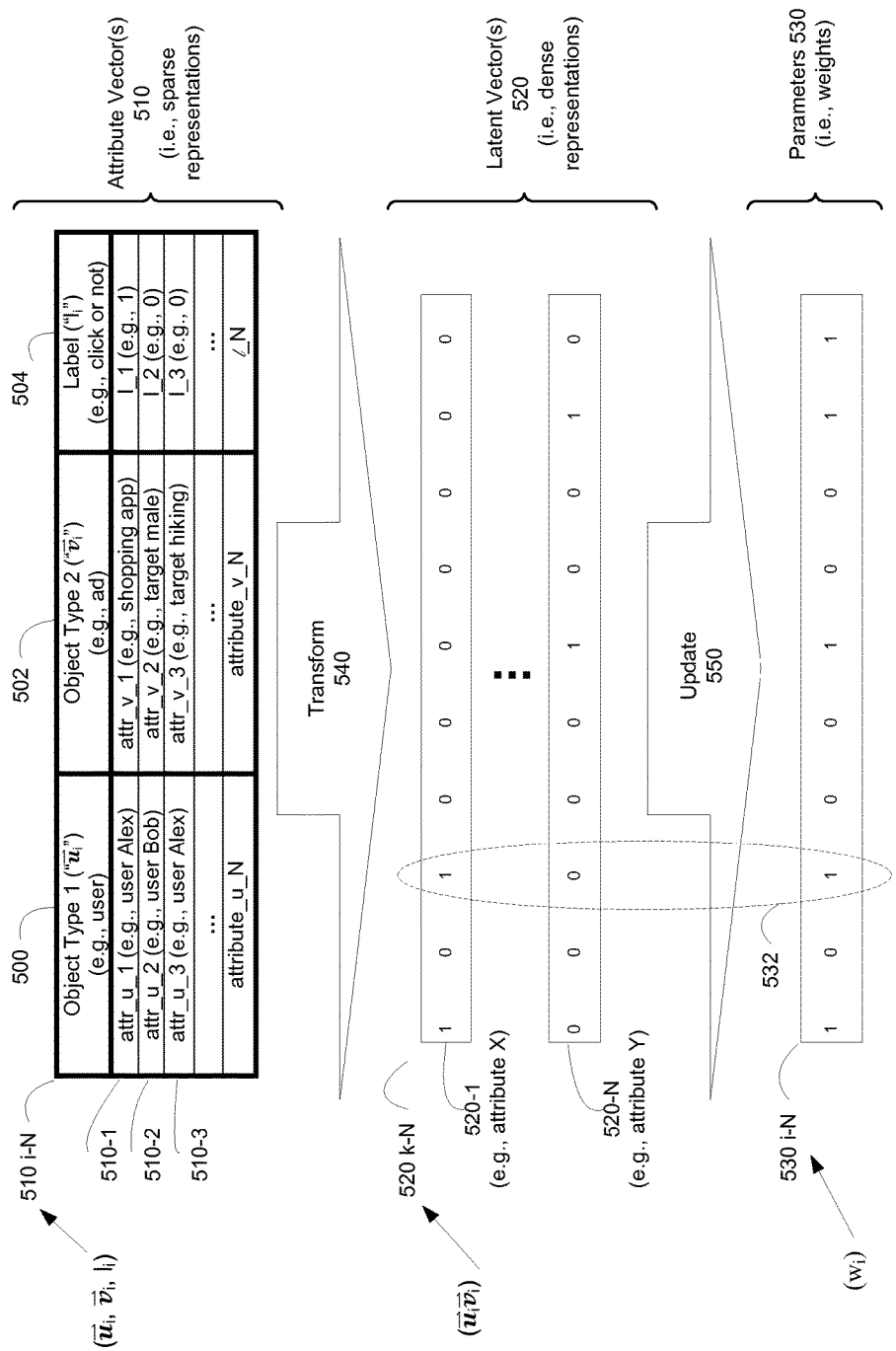
FIG. 5 is a data flow diagram of example datasets generated during the various processing stages of the model training system.

FIG. 4 is a block diagram illustrating sets of processors that can execute processes in one or more processing stages of a model training system 400, in accordance with some embodiments. The model training system 400 can be the model training system 110 of FIG. 1 or the model training system 300 of FIG. 3. For ease of illustration, FIG. 4 will be discussed in conjunction with FIG. 5. FIG. 5 is a data flow diagram of example datasets generated during the various processing stages of the model training system 400.

As illustrated in the embodiments of FIG. 4, the model training system 400 can be implemented by an organized chain of processing stages 410, 412, 414, 416, and 418. A loader engine 420 can perform one or more operations for processing data in the processing stage 410. A parser engine 430 can perform one or more operations for processing data in the processing stage 412. A dictionary engine 440 can perform one or more operations for processing data in the processing stage 414. A learning engine 450 can perform one or more operations for processing data in the processing stage 416. An evaluation engine can perform one or more operations for processing data in the processing stage 418.

In some embodiments, each engine corresponding to the processing stages 410, 412, 414, 416, or 418 can be implemented by a set of one or more independent, but identical computer processors in a computer server system as configured by a set of executable instructions. Each processor can represent a processing thread for performing one or more operations at the respective stage. That is, each stage is capable of multi-threaded processing using the set of processors. The number of processors implementing the engine at a respective processing stage can be configurable. For example, the parser engine 430, which typically requires intensive CPU usage, can be configured to have a higher number of processors for enabling more processing threads. In another example, the learning engine 450, which also typically performs CPU-intensive operations, can be configured to have a large number of processors to enable more processing threads.

In some embodiments, one or more of the processing stages 410, 412, 414, 416, and 418 can be associated with a processing stage of the system 300 illustrated in FIG. 3. For example, the processing stages 410, 412, and 414 can be a part of the first processing stage 310 in accordance with some embodiments. In such embodiments, the processors implementing the engines 420, 430, and 440 at the processing stages 410, 412, and 414 can be a subset of the processor(s) 312 discussed in FIG. 3. In some embodiments, the processing stages 416 and 418, for example, can be a part of the second processing stage 320 of FIG. 3. In such embodiments, the processors implementing the engines 450 and 460 at the processing stages 416 and 418 can be a subset of the processor(s) 322 discussed in FIG. 3.

In some embodiments, an output of each processing stage serves as the input of a next processing stage. In some embodiments, the processing stages 410-418 are connected through processing queues 470, 472, 474, and 476, such that the output of each stage is written to a respective queue for access by an engine of the next stage. Each processing queue can be instantiated on a memory device, and operates as a memory space where data is written into and read from by one or more processors of an engine. For example, an output from a given processing stage can be written to a given processing queue, which can be accessed to serve as an input to the next processing stage.

In an illustrative example data flow, the model training system 400 can start learning a model by taking in training data 510 at the processing stage 410. In some embodiments, the training data 510 is prepared in a predefined format for loading by the loader engine 420 at the processing stage 410. Specifically, the training data 510 can be prepared and stored as a partitioned Hive table format where the first three columns correspond to the sparse attribute vectors 500, 502 of the first and second objects being analyzed (e.g., $\vec{u}$ and $\vec{v}$) and a label 504 associated with the two objects (e.g., label y). The loader engine 420 can be configured to load the formatted training data 510 into the system 400 (e.g., from a Hive data warehouse).

As discussed above in reference to FIG. 1, the training data 510 can include multiple individual data sets 510 $i$-N, where i is an integer representative of a particular individual data set (e.g., i=1 for a first individual data set), and N is an integer greater than 1. An individual data set 510$i$ is representative of a training instance of the training data 510. The training data can be associated with multiple first objects and multiple second objects. That is, an individual data set 510$i$ may be associated with a different user than an individual data set 510 $i$+1 or an individual dataset 510 $i$+2. In some embodiments, the individual data sets 510 $i$-N are shuffled before being loaded into the system 400, such that a likelihood that consecutive individual data sets correspond to the same object can be substantially low. For example, a first individual data set 510-1 can include an attribute of the first object (e.g., a first attribute), an attribute of the second object (e.g., a second attribute), and a label indicating a relationship, or correlation, between the first and second objects. A second individual data set 510-2 can include another attribute of the first object (e.g., a third attribute), another attribute of the second object (e.g., a fourth attribute), and the label. A third individual data set 510-3 can include an attribute of a third object, an attribute of the second object, and a label indicating a correlation between the third and second objects. Upon a shuffle of these example individual data sets, the first training instance being analyzed by the system 400 can be the individual data set 510-3, which corresponds to the third object, while the second training instance being analyzed can be the individual data set 510-2, which corresponds to the first object. Such "shuffling" of the training data 510 can further help the parallel processing implemented by the system 400, and result in an even lower likelihood of collision when updating the model parameters, as will be discussed in further detail below with respect to the learning engine 450.

The loader engine 420 can be configured to load the individual data sets 510 $i$-N in parallel. For example, the first individual data set 510-1 can be read concurrently as the second individual data set 510-2 by using a first and second processors implementing the loader engine 420. A resulting output (i.e., a processed individual data set) from any processor of the set of processors implementing the loader engine 420 can be written, or stored, in the processing queue 470, for access by the parser engine 430 in the (next) processing stage 412. There may exist multiple resulting outputs depending on a number of processors employed by the loader engine 420. For example, the loader engine 420 can be configured to only have one processor, in which case, only one individual data set 510$i$ is processed at a time by the loader engine 420, resulting in one output at a time. In the example above, where two processors implement the loader engine 420, the two individual data sets 510-1 and 510-2 being processed in parallel can produce two resulting outputs.

The parser engine 430 at the processing stage 412 can retrieve a particular resulting output from the processing queue 470 by employing any one of its processors; in some embodiments, the parser engine 430 may only have one processor, which may access the resulting output when the processor is not occupied (e.g., busy processing another dataset). The parser engine 430 can be configured to parse the raw string of data representing the individual data set, which has been loaded into the system 400 by the loader engine 420. In particular, the parser engine 430 can parse the raw string for writing into an appropriate data structure that represents the training data 510 (e.g., a dense representation or latent vector). Similar to the resulting output(s) of the loader engine, resulting output(s) from the parser engine 430 can be written and stored in the queue 472 for access by the dictionary engine 440 in the next stage 414.

In the processing stage 414, the dictionary engine can be configured to map the original values of the attributes present in the individual datasets to index a model parameter. Such mapping is beneficial, for example, to enable efficient processing later by the learning engine and the evaluation engine. In particular, the processing of the dictionary engine provides a map that can be utilized to look up a data string to retrieve the parameter indexed using that string.

At the processing stage 416, the learning engine 450 can be configured to perform one or more operations to update parameters of the model being learned by the model training system 400. As discussed above, the learning engine 450 can perform the operations on the individual data sets 510 $i$-N in parallel to update the parameters. That is, processors of the learning engine 450 can process the individual data sets 510 $i$-N at the same time to update the model parameters at the same time. Note that existing systems typically perform the model parameter update sequentially, by processing one individual data set at a time to perform the update. In contrast, as disclosed here, the processors of the learning engine 450 can have equal access to a shared memory storing the model parameters, so that they can update, in parallel, individual components of the memory at will. Furthermore, due to the sparse nature of the individual data sets, data access to the shared memory is sparse, and the processors, as a result, can perform the operations in parallel without locks. That is, when individual operations only modify a small part of the variable in the shared memory, memory overwrites are rare and, when the overwrites do occur, they introduce barely any error into the computation.

The one or more operations (performed by the learning engine 450) can be, or include, executing steps of a stochastic gradient descent (SGD) process. Under the SGD process, the learning engine 450 computes a gradient for the individual data sets 510 $i$-N. The gradient can be computed by performing a dimensionality reduction on the individual data sets 510 $i$-N to generate a set of latent vectors 520 $i$-N for attributes derived from the individual data sets 510 $i$-N. The learning engine 450 then utilizes the gradient to update the model parameters stored in the same data structure, a weight matrix 530 of FIG. 5 (i.e., matrix w). Updating the model parameters involves computing a compatibility score, where such computation involves a vector product between the two new transformed latent vectors corresponding to the pair of objects 500 and 502.

In some cases, an update by a processor (e.g., processing an individual data set 510-1) may be overwritten by another processor (e.g., processing an individual data set 510-2). Such collision in updates is acceptable under the implementation disclosed here because of the sparse nature of the attribute vectors of the two objects. For example, referring back to FIG. 5, for the attribute vector $\vec{u}$, every element in the vector corresponds to a particular attribute. In that vector, there is likely a high number of attributes that may be associated with the user u, where only a small percentage of those attributes has actual correlation with the user u. For example, there may be millions of possible pages that the user can like, but only a few hundreds that the user actually liked. As such, the attribute vector $\vec{u}$ can have a small number of non-zero values for the attributes in that vector, with a large majority being zeros, resulting in a "sparse" attribute vector. Furthermore, as discussed above, because the training data 510 is shuffled before being received by the system 400, the likelihood of collision when updating the model parameters is even lower. That is, given an arbitrary pair of two individual data sets (e.g., randomly shuffled data sets 510-1 and 510-2), the likelihood that they collide in terms of the model parameter being updated is low because those data sets will likely not correspond to the same parameter.

In embodiments, the SGD process generates a set of parameters for every attribute in the training data 510. This set of parameters can be represented by a latent vector of the attribute (e.g., latent vector 520). As a result of analyzing all training data 510, every attribute is provided with a latent vector that operates as a profile for that attribute. The latent vector 520 can be adjusted for every new individual data set 510$i$ being processed by the learning engine 450. For example, upon completion of the SGD process for all of the training data 510, it can be seen that a pair of attributes has a high compatibility (i.e., strong match) based on a lot of matching individual data sets between objects. For example, the training data 510 indicates that users who like football (e.g., attribute X) also like to visit a sports shoe shopping website.

In implementation of the SGD process, each processor of the learning engine 450 samples, or processes, an individual dataset 510$i$, computes the gradient of the latent vector F for a particular attribute, then writes the weight value for the particular attribute into the shared memory storing a matrix w (weight) of the model parameters, leaving all of the other attributes alone. Here, even though a given processor has no knowledge as to whether any of the other processors has modified the parameter for that particular attribute, the likelihood of collision (i.e., simultaneous update) is low given the sparse data (in addition to the individual data sets having been shuffled). In implementation, the matrix w is a sparse, non-negative matrix that indexes compatibility, or similarity, between two objects (e.g., user-ad pair). In particular, the compatibility is identified based on correlations between pairs of attributes between two objects, e.g., a first object u and a second object v.

In the second processing stage 220, the system generates a dense representation (or dense data) for each feature vector corresponding to a given object. In particular, the system analyzes the sparse data in a feature vector to learn how the data are connected to each other. An example dense representation for a "user Alex" object includes all the pages, ads, apps, and other entities that are associated with the user Alex. In an illustrative example, based on the latent vectors, a high number of objects that have attribute X has shown interest in an object having attribute Y, and therefore, a user having attribute X will likely show interest in the object.

The latent vectors of the attributes can be used in production models, such as gradient boosted decision trees (GBDTs), to determine compatibility for other groupings of attributes. As will be discussed in further details below, given a known object with particular attributes, for example, a production engine can make a prediction for a pair of attributes based on the latent profiles corresponding to those two attributes.

At the processing stage 418, the evaluation engine 460 can be configured to compute and accumulate losses associated with the scoring function. The loss functions utilized by one or more processors of the evaluation engine 460 can include, for example, a squared loss function, a logistic loss function, or a hinge loss function.

FIG. 5 illustrate the training data 510, the latent vectors 520 (i.e., the dense representation), and resulting weight set 530 (i.e., model parameters). In the embodiments of FIG. 5, the training data 510 is a sparse representation of attributes associated with a first object (e.g., object of type X) and a second object (e.g., object of type Y). The training data 510 includes individual data sets 510 $i$-N, where each individual data set includes a first attribute associated with an object of the first type (e.g., a user), a second attribute associated with an object of the second type (e.g., an ad), and a label indicating the correlation between the first and second objects.

As discussed in FIG. 4, the individual data sets 510 $i$-N can be loaded into the model training system 400 of FIG. 4 for processing. Through processing by the system 400, the individual data sets 510 $i$-N are transformed into the latent vectors 520 $k$-N, as indicated by block 540. Each latent vector represents a profile of a particular attribute. For example, the latent vector 520-1 can represent the profile of the attribute X, where the profile indicates what other attributes are associated with attribute X. Based on the latent vectors 520, the system 400 can update model parameters 530 associated with a scoring function. The model parameters are captured in a weight set w of weight values. In particular, $w_{uv}$ indexes similarity of $\vec{u}$ and $\vec{v}$ in each individual data set (i.e., a raw data string).

Updating of the parameters can be implemented by, for example, the learning engine 450 of FIG. 4. In particular, the learning engine 450 can perform a SGD process in parallel to update each weight value (i.e., parameter) of the weight set based on the individual data sets 510 $i$-N, such that a particular weight value may be updated concurrently. While the particular weight value may be overwritten based on different updates, as discussed above, due to the sparse nature of the individual data sets, a collision of the updating by the different processors of the learning engine 450 is unlikely.

Figure 6:
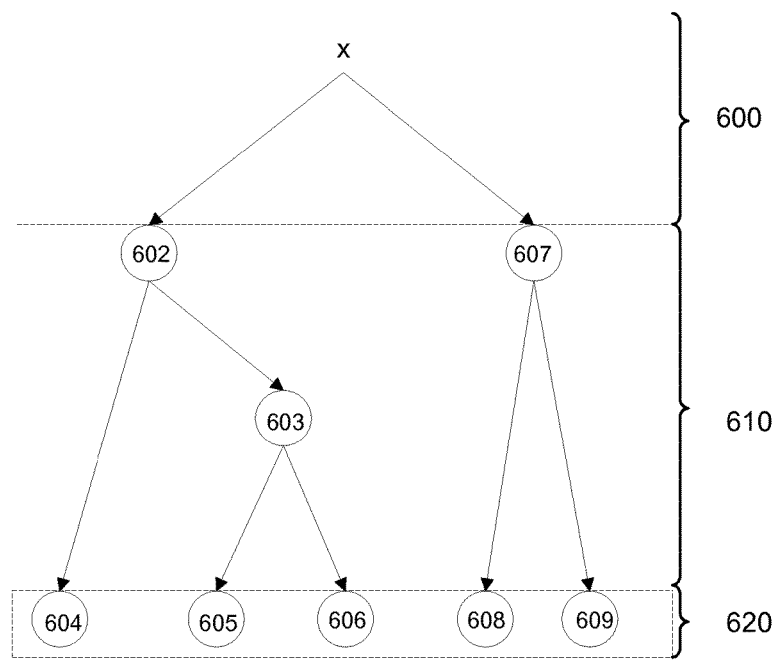
FIG. 6 is a graph illustrating an example implementation in which outputs of the scoring function are used as input attributes for a boosted decision trees analysis.

FIG. 6 is a graph illustrating an example implementation in which outputs of the scoring function are used as input attributes 600 for a boosted decision trees analysis. In some embodiments, with the generation of a compatibility score for a pair of objects, a latent vector is created for each pair of attributes corresponding to the objects. The latent vector is then passed to a set of decision trees 610 for analysis (e.g., boosted decision trees). The set of decision trees 610 can include multiple nodes, where each node represents a particular attribute value. At a given node, a determination is made whether the attribute value from an individual data set (i.e., a training instance) is greater or equal than the particular attribute value at the given node to proceed to a particular branch. This determination process continues through all nodes of a given decision tree. That is, at every node, a particular variable in the latent vector is analyzed to make a decision according to that value and node to reach a particular leaf.

For example, the boosted tree model illustrated in FIG. 6 includes two subtrees, e.g., a first subtree starting at node 602 and second subtree starting at node 607. The first subtree has three leafs 604, 605, and 606, and the second subtree has two leaves 608 and 609. If an individual data set ends up in a second leaf 605 of the first tree and in a first leaf 608 of the second tree, then the resulting values will be the binary vector [0, 1, 0, 1, 0]. This boosted decision tree based transformation of the input attributes can be understood as a supervised encoding that converts a real-valued vector into a compact binary-valued vector. That is, the resulting transformed latent vector 620 represents a (new) dense representation for the pair where it is binarized. That is, this set of binary variables is available to indicate which leaf this particular attribute pair falls into.

The new transformed latent vector 620 for the attribute, or feature, can be represented as F, which denotes an array of binary values for the attribute pair. F can be combined with w linearly to determine the final score for the object pair. The score serves as an additional signal that interacts with existing signals for a pair of objects.

Figure 7:
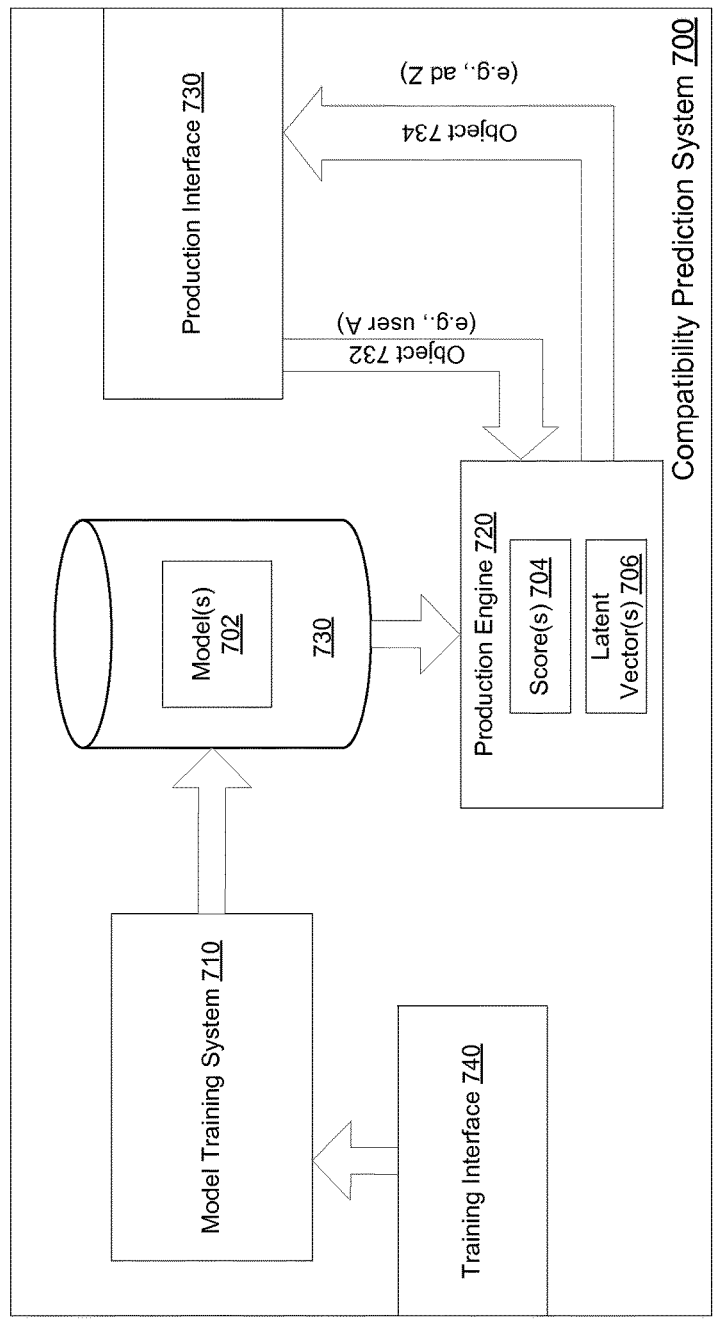
FIG. 7 is a block diagram illustrating a compatibility prediction system that generates one or more models and uses the models to evaluate compatibilities for various groupings of objects.

FIG. 7 is a block diagram illustrating a compatibility prediction system 700 that generates one or more models and uses the model(s) to evaluate compatibilities for various groupings of objects, in accordance with some embodiments. In accordance with the embodiments of FIG. 7, the compatibility prediction system 700 includes a model training system 710 for training a model 702, a production engine 720, a production interface 730, and a model training interface 740 ("training interface 740").

For ease of discussion regarding FIG. 7, consider an illustrative example of a "user A" accessing a service application implemented by a social networking system, where that social networking system utilizes the compatibility prediction system 700. Responsive to user A visiting the service application, the production interface 730 sends a request to the production engine 720, where that request includes information about the user A (i.e., object 832). The information can include attributes of user A (e.g., male, age 23, likes Techcrunch™). The production engine 720 computes score(s) 704 for the user A with different ads based on attributes of the user and the respective ads. For example, the production engine 720 computes five scores for user A with five different ads, which are potential objects that can be potentially compatible with user A based on their respective attributes in correlation with attributes of user A. In particular, the production engine 720 first computes a particular score 704 for user A and a particular ad, then appends that score to a respective latent vector 706 that is associated with attributes of the particular ad. The final score for that user and ad pair is then generated. The model(s) 702 can be gradient boosted decision trees (GBDTs).

In some embodiments, the production engine 720 ranks the potential objects (e.g., ads) for user A based on the computed (final) scores 704. In such embodiments, an object 734 having the highest score (e.g., ad) can be returned to the production interface 730. For example, the object 734 that corresponds to the object 832, based on its highest score, is presented to the user A on the application service of the social networking system.

Figure 8:
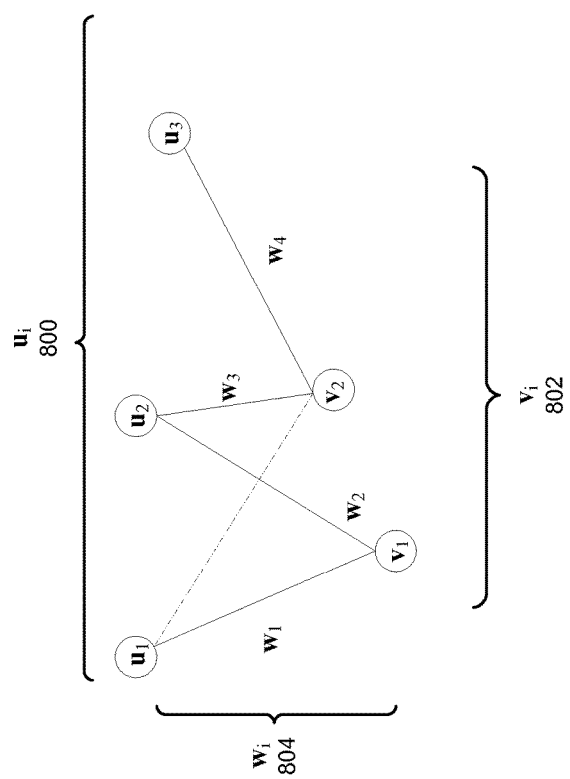
FIG. 8 is a graphical depiction of correlations between groupings of objects based on weight parameters associated with a model generated by a model training system.

FIG. 8 is a graphical depiction of correlations between groupings of objects based on weight parameters associated with a model generated by a model training system, in accordance with some embodiments. In existing compatibility predicting systems, only direct relationships can generally be determined based on one-to-one matching. In contrast, the embodiments of this disclosure provide the capability of determining indirect relationships indicative of similarities between different objects (e.g., $u_1$ and $v_2$) based on correlations between attributes of those objects, particularly (but not exclusively) by looking at nearby objects sharing same or similar attributes (e.g., $u_2$ and $v_1$).

As illustrated in FIG. 8, a set of first objects 800 (e.g., set of users) is represented by $u_i$, which denotes features of a given first object i (e.g., $u_1$-$u_3$ denote features of "user 1" through "user 3"), and a set of second objects 8002 (e.g., set of ads) is represented by $v_i$, which denotes features of a given second object i (e.g., $v_1$-$v_3$ denote features of "ad 1" through "ad 3"). A set of weights 804 is represented by $w_i$, which denotes a weight value of a given weight, where each weight value between two objects provides an indication of how strongly associated are the two object to each other. The distance between the set of objects 800 and the set of objects 802 can be graphically illustrated based on the set of weights 804.

By observing the graphical depiction of FIG. 8, a user can determine both direct and indirect relationships between objects. For example, an indirect relationship between object $u_1$ and $v_2$ can be determined based on the direct relationship mapped between objects $u_1$ and $v_1$ and the direct relationship mapped between objects $u_2$ and $v_2$. Furthermore, the strength of each relationship between a pair of objects $u_1$ and $v_1$ can be determined based on the distance between those objects, where that distance is represented by a weight value associated with that relationship. For example, by looking at the graphical depiction (of the weights), it can be determined that object $u_2$ is more strongly matched with object $v_2$ than the pairing of objects $u_1$ and $v_1$.

FIG. 9 is a pseudo-code block illustrating a method of building the model to determine a compatibility score between two objects based on corresponding attributes of the objects. Steps 901-911 illustrate an example method of taking, as inputs, attribute vectors $\vec{u}$ and $\vec{v}$ for i number of pairs of object u and v ($\vec{u}_i$, $\vec{v}_i$) and corresponding correlation labels l, to determine a weight vector $\vec{w}$, as a basis of a linear model that can be used with the feature vectors of $\vec{u}$ and $\vec{v}$ to compute a final compatibility score for any pair of objects sharing the attributes in the feature vectors.

Figure 10:
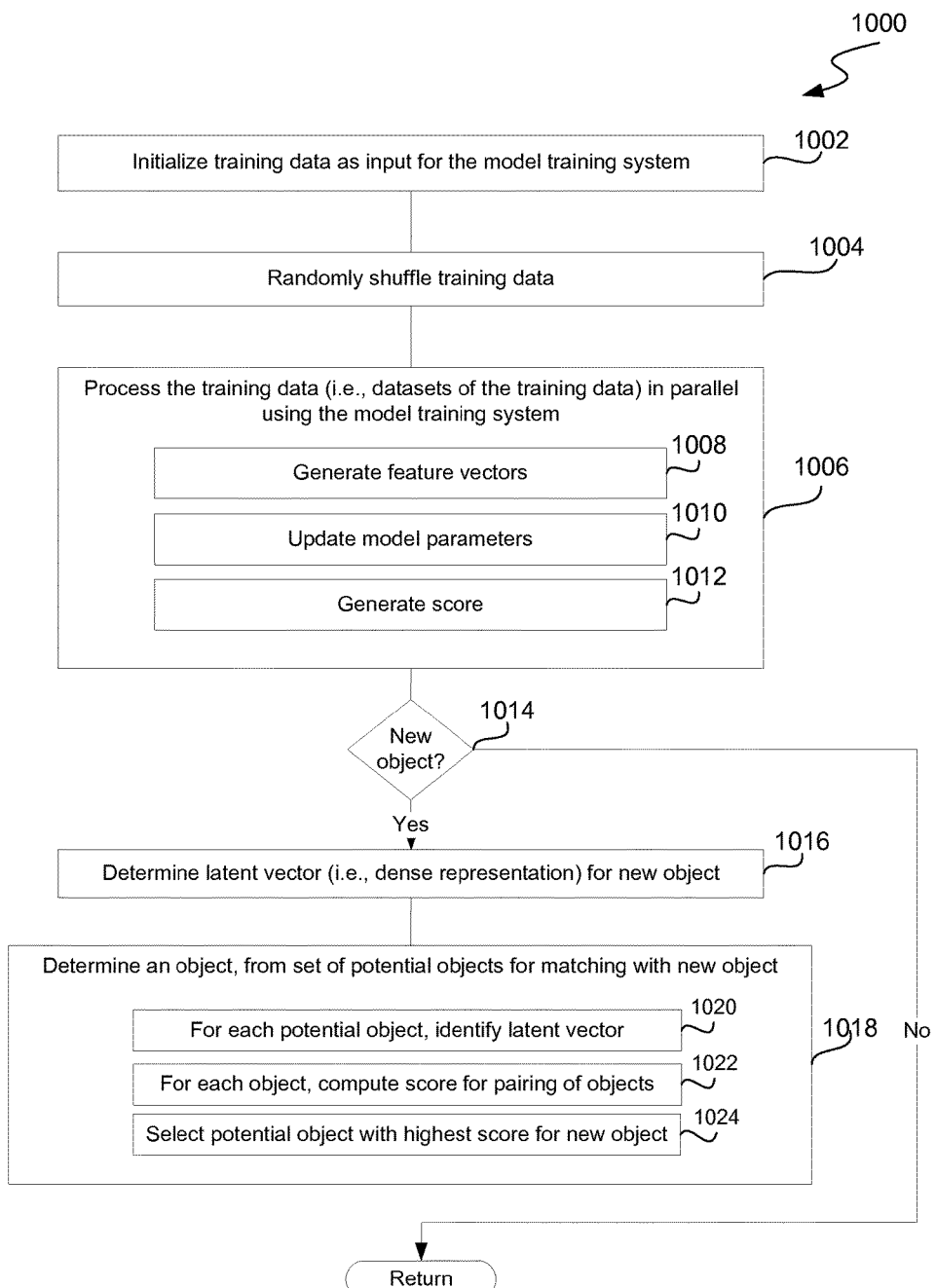
FIG. 10 is a flow chart illustrating a method of predicting compatibility for a pairing of objects.

FIG. 10 is a flow chart illustrating a method 1000 of predicting compatibility for a pairing of objects, in accordance with various embodiments. In some embodiments, the method 1000 can be implemented by a computer system ("System") that executes the model training system. For example, the System can be a part of or include the compatibility prediction system 700 of FIG. 7. In another example, the System can be a part of or include the social networking system 1204 of FIG. 12.

At block 1002, the System initializes training data in preparation for serving as input to the model training system. The training data can include one or more datasets, or training data instances. In some embodiments, initializing the training data can include preparing the data to be in a format suitable for processing by the learning process utilized by the model training system (e.g., Double Helix learning process). Specifically, in some embodiments, the training data is prepared by storing the data as a partitioned Hive table where the first three columns of the table correspond to sparse attribute vectors $\vec{u}$, $\vec{v}$, and the label l. An example format for preparing the training data can be a JSON encoded array where each element in the array represents the attribute key. For example, the array can be an array of page IDs that a user has liked before. Another example format for preparing the data can be a JSON encoded map in which each grouping of two objects represents "attributekey:valuepair." As used here, the "valuepair" is a value representative of a degree of association of the user to the (key) attribute. The table can be created in an RCFile format. Such format can be beneficial for use in a Hive Loader as it enables faster processing by the Hive loader. At block 1004, the training data in the table format is shuffled randomly. As discussed above, such shuffling reduces the likelihood of collision when updating model parameters based on the training datasets.

At block 1006, the System processes individual data sets of the training data in parallel. In some embodiments, block 1006 includes processing indicated in block 1008, block 1010, and block 1012. In particular, at block 1008, a feature vector is generated for every attribute in the training data sets. That is, a particular feature vector is representative of a profile of a particular attribute, and includes information about other attributes that correlate to the particular attribute. For example, a feature vector of an attribute "non-profit organization" can include attributes of various objects that have had an interaction or relationship with another object having the "non-profit organization" attribute. The various objects can include, for example, userX, userY, and userZ with respective attributes of age 25, gardener, location Bay Area, and the other object can be "BayAreaNatureConservancy." In such an example, the feature vector for "non-profit organization" would include "age 25," "gardener," and "Bay Area." Based on this feature vector, a strong match can be predicted for a new (unknown) user who is of age 25 and is in the Bay Area by matching the new user to another user who is an active member of "BayAreaNatureConservancy."

At block 1010, model parameters are updated based on the data sets. A particular parameter corresponds to a weight associated with a pairing of features. As such, the more matches (e.g., based on the label) are found for the individual data sets, the greater the weight value. At block 1012, a score is generated for each pairing of objects based on the individual data sets of the training data. The feature vectors, the model parameters, and the scores are stored in a database for use in making predictions about compatibilities for new (unknown) objects.

At block 1014, the System determines whether a new query associated with a new (unknown) object is received, where the new query is requesting a matching query to be predicted for the new object. At block 1016, the System determines the latent vector for the new object. In particular, the System can determine another (known) object that has attributes similar to that of the new object and identify the latent vector of that known object. At block 1018, the System determines an object, from a set of one or more potential objects, as a match for the new object. The potential objects are known objects with their respective latent vectors stored in a database associated with the System. In particular, at block 1020, the System identifies the latent vector for each potential object. At block 1022, a score for a pairing of the new object with each potential object is computed using the respective latent vectors. At block 1024, a particular potential object that has a highest score when paired with the new object is selected.

Figure 11:
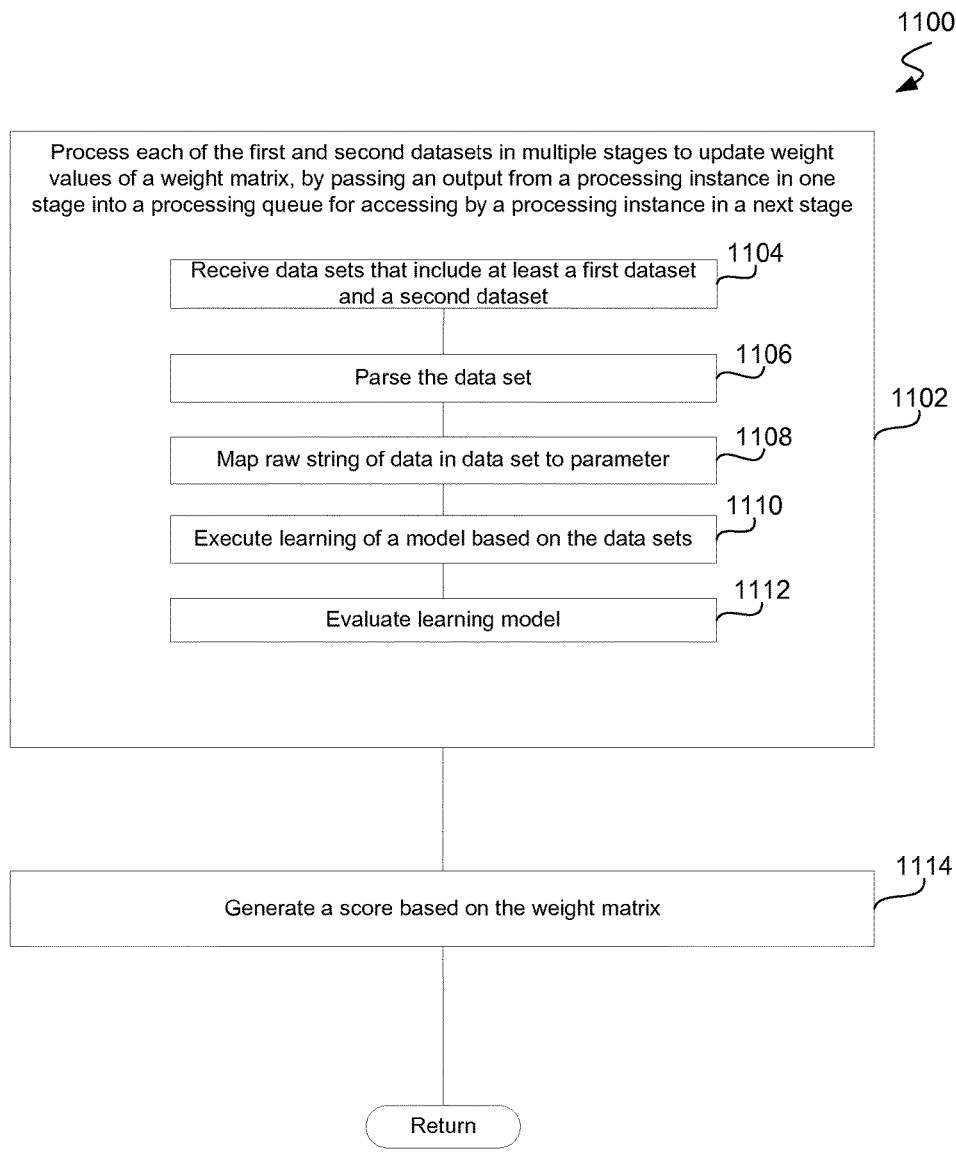
FIG. 11 is a flow chart illustrating a method 1100 of generating a compatibility score.

FIG. 11 is a flow chart illustrating an example method 1100 of generating a compatibility score for grouping of objects based on correlations between corresponding attributes of the objects, in accordance with some embodiments. In some embodiments, the method 1100 can be a part of the processes executed in block 1006 of FIG. 10. The method 1100 can be implemented by the compatibility prediction system 700 of FIG. 7. In other embodiments, the method 1100 can be implemented by the social networking system 1204 of FIG. 12. In yet other embodiments, the method 1100 can be implemented by the model training system 110 of FIG. 1.

At block 1102, one or more data sets representative of training instances of training data are processed in multiple stages to update a weight matrix. In particular, the processing includes passing an output from a processing instance in one stage into a processing queue for accessing by a processing instance in a next stage. In particular, at block 114, the method 1100 starts with the one or more data sets being loaded in parallel (e.g., via loader engine) into the system by a processing instance of a loader engine. At block 1106, each data set is parsed (e.g., in parallel with other data sets), for example, by a processing instance of a parser engine. At block 1108, each data set (e.g., a row of data of the training data table) is mapped to a parameter as part of an index. Such mapping can be beneficial from an efficiency standpoint as it allows for a quick index lookup of a raw string of data to identify a particular parameter.

At block 1110, learning of the model is executed by analyzing the data sets. In particular, such learning can be done by using the index created at block 1108 for faster processing. The learning can include analyzing attributes captured in the datasets and updating model parameters associated with those attributes. At block 1112, the model is evaluated by computing and accumulating losses. At block 1114, a final score is generated using the updated model parameters, or weight values in the weight matrix.

While processes or blocks are presented in a given order in this disclosure, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

Social Networking System Environment and Architecture

Several embodiments of the model training system 110 utilize or are part of a social networking system. Social networking systems commonly provide mechanisms enabling users to interact with objects and other users both within and external to the context of the social networking system. A social networking system user may be an individual or any other entity, e.g., a business or other non-person entity. The social networking system may utilize a web-based interface or a mobile interface comprising a series of inter-connected pages displaying and enabling users to interact with social networking system objects and information.

A social networking system may provide various means to interact with nonperson objects within the social networking system. For example, a user may form or join groups, or become a fan of a fan page within the social networking system. In addition, a user may create, download, view, upload, link to, tag, edit, or play a social networking system object. A user may interact with social networking system objects outside of the context of the social networking system. For example, an article on a news web site might have a "like" button that users can click. In each of these instances, the interaction between the user and the object may be represented by an edge in the social graph connecting the node of the user to the node of the object. A user may use location detection functionality (such as a GPS receiver on a mobile device) to "check in" to a particular location, and an edge may connect the user's node with the location's node in the social graph.

Figure 12:
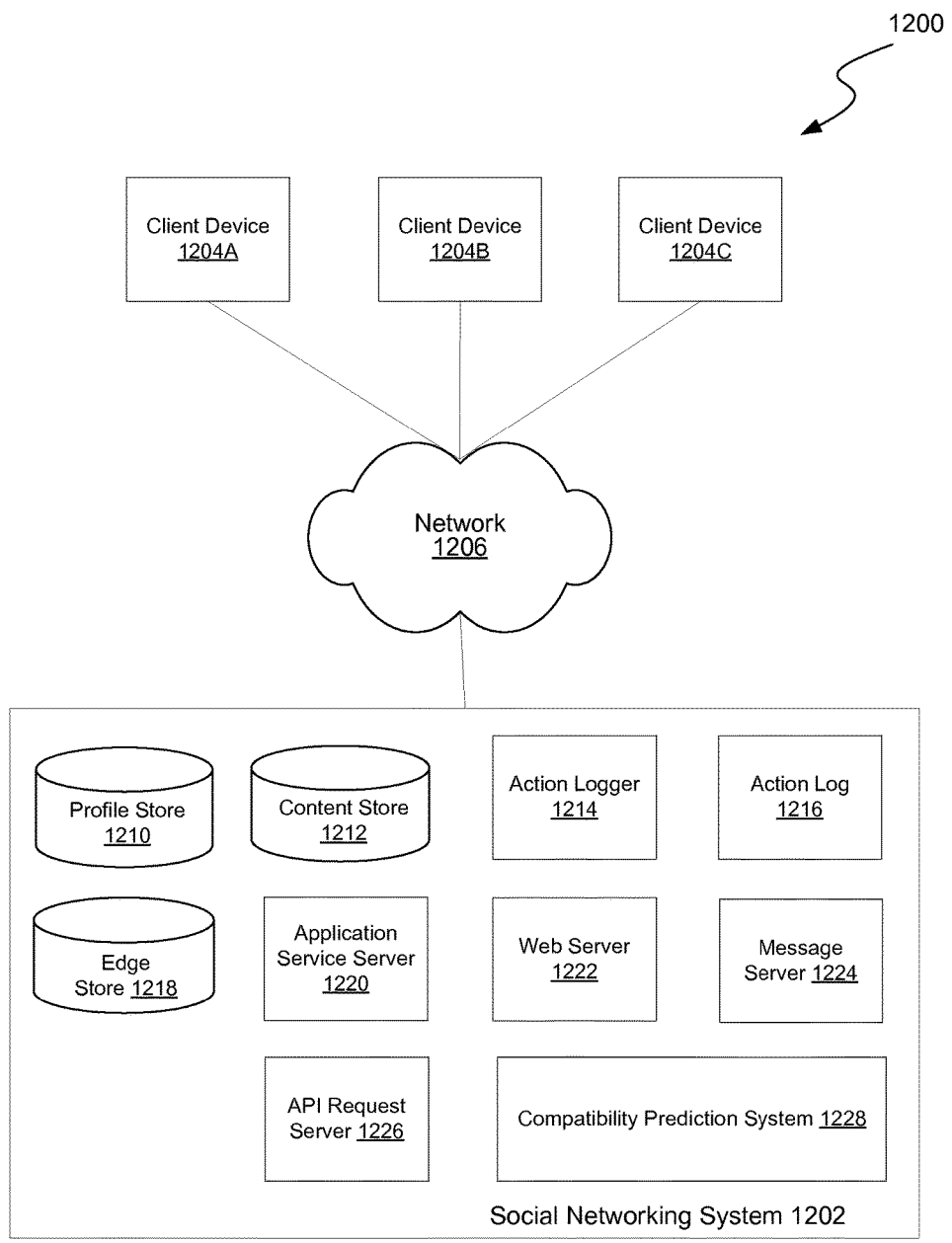
FIG. 12 is a high-level block diagram of a system environment suitable for a social networking system.

FIG. 12 illustrates an example architecture 1200 of a social networking system 1202, in accordance with some embodiments. The social networking system 1202 comprises one or more computing devices storing user profiles associated with users (i.e., social networking accounts) and/or other objects as well as connections between users and other users and/or objects. Users join the social networking system 1202 and then add connections to other users or objects of the social networking system to which they desire to be connected. Users of the social networking system 1202 may be individuals or entities, e.g., businesses, organizations, universities, manufacturers, etc. The social networking system 1202 enables its users to interact with each other as well as with other objects maintained by the social networking system 1202. In some embodiments, the social networking system 1202 enables users to interact with third-party websites and a financial account provider.

Based on stored data about users, objects and connections between users and/or objects, the social networking system 1202 generates and maintains a "social graph" comprising multiple nodes interconnected by multiple edges. Each node in the social graph represents an object or user that can act on another node and/or that can be acted on by another node. An edge between two nodes in the social graph represents a particular kind of connection between the two nodes, which may result from an action that was performed by one of the nodes on the other node. For example, when a user identifies an additional user as a friend, an edge in the social graph is generated connecting a node representing the first user and an additional node representing the additional user. The generated edge has a connection type indicating that the users are friends. As various nodes interact with each other, the social networking system 1202 adds and/or modifies edges connecting the various nodes to reflect the interactions.

The client device 1204A is a computing device capable of receiving user input as well as transmitting and/or receiving data via the network channel 1206. In at least one embodiment, the client device 1204A is a conventional computer system, e.g., a desktop or laptop computer. In another embodiment, the client device 1204A may be a device having computer functionality, e.g., a personal digital assistant (PDA), mobile telephone, a tablet, a smart-phone or similar device. In yet another embodiment, the client device 1204A can be a virtualized desktop running on a cloud computing service. The client device 1204A is configured to communicate with the social networking system 1202 via a network channel 1206 (e.g., an intranet or the Internet). In at least one embodiment, the client device 1204A executes an application enabling a user of the client device 1204A to interact with the social networking system 1202. For example, the client device 1204A executes a browser application to enable interaction between the client device 1204A and the social networking system 1202 via the network channel 1206. In another embodiment, the client device 1204A interacts with the social networking system 1202 through an application programming interface (API) that runs on the native operating system of the client device 1204A, e.g., IOS® or ANDROID™.

The client device 1204A is configured to communicate via the network channel 1206, which may comprise any combination of local area and/or wide area networks, using both wired and wireless communication systems. In at least one embodiment, the network channel 1206 uses standard communications technologies and/or protocols. Thus, the network channel 1206 may include links using technologies, e.g., Ethernet, 802.11, worldwide interoperability for microwave access (WiMAX), 3G, 4G, CDMA, digital subscriber line (DSL), etc. Similarly, the networking protocols used on the network channel 1206 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network channel 1206 may be represented using technologies and/or formats including hypertext markup language (HTML) or extensible markup language (XML). In addition, all or some of links can be encrypted using conventional encryption technologies, e.g., secure sockets layer (SSL), transport layer security (TLS), and Internet Protocol security (IPsec).

The social networking system 1202 includes a profile store 1210, a content store 1212, an action logger 1214, an action log 1216, an edge store 1218, an application service server 1220, a web server 1222, a message server 1224, an application service interface (API) request server 1226, a compatibility prediction system 1228, or any combination thereof. In other embodiments, the social networking system 1202 may include additional, fewer, or different modules for various applications.

User of the social networking system 1202 can be associated with a user profile, which is stored in the profile store 1210. The user profile is associated with a social networking account. A user profile includes declarative information about the user that was explicitly shared by the user, and may include profile information inferred by the social networking system 1202. In some embodiments, a user profile includes multiple data fields, each data field describing one or more attributes of the corresponding user of the social networking system 1202. The user profile information stored in the profile store 1210 describes the users of the social networking system 1202, including biographic, demographic, and other types of descriptive information, e.g., work experience, educational history, gender, hobbies or preferences, location and the like. A user profile may also store other information provided by the user, for example, images or videos. In some embodiments, images of users may be tagged with identification information of users of the social networking system 1202 displayed in an image. A user profile in the profile store 1210 may also maintain references to actions by the corresponding user performed on content items (e.g., items in the content store 1212) and stored in the edge store 1218 or the action log 1216.

A user profile may be associated with one or more financial accounts, enabling the user profile to include data retrieved from or derived from a financial account. In some embodiments, information from the financial account is stored in the profile store 1210. In other embodiments, it may be stored in an external store.

A user may specify one or more privacy settings, which are stored in the user profile, that limit information shared through the social networking system 1202. For example, a privacy setting limits access to cache appliances associated with users of the social networking system 1202.

The content store 1212 stores content items (e.g., images, videos, or audio files) associated with a user profile. The content store 1212 can also store references to content items that are stored in an external storage or external system. Content items from the content store 1212 may be displayed when a user profile is viewed or when other content associated with the user profile is viewed. For example, displayed content items may show images or video associated with a user profile or show text describing a user's status. Additionally, other content items may facilitate user engagement by encouraging a user to expand his connections to other users, to invite new users to the system or to increase interaction with the social networking system by displaying content related to users, objects, activities, or functionalities of the social networking system 1202. Examples of social networking content items include suggested connections or suggestions to perform other actions, media provided to, or maintained by, the social networking system 1202 (e.g., pictures or videos), status messages or links posted by users to the social networking system, events, groups, pages (e.g., representing an organization or commercial entity), and any other content provided by, or accessible via, the social networking system.

The content store 1212 also includes one or more pages associated with entities having user profiles in the profile store 1210. An entity can be a non-individual user of the social networking system 1202, e.g., a business, a vendor, an organization, or a university. A page includes content associated with an entity and instructions for presenting the content to a social networking system user. For example, a page identifies content associated with the entity's user profile as well as information describing how to present the content to users viewing the brand page. Vendors may be associated with pages in the content store 1212, enabling social networking system users to more easily interact with the vendor via the social networking system 1202. A vendor identifier is associated with a vendor's page, thereby enabling the social networking system 1202 to identify the vendor and/or to retrieve additional information about the vendor from the profile store 1210, the action log 1216 or from any other suitable source using the vendor identifier. In some embodiments, the content store 1212 may also store one or more targeting criteria associated with stored objects and identifying one or more characteristics of a user to which the object is eligible to be presented.

The action logger 1214 receives communications about user actions on and/or off the social networking system 1202, populating the action log 1216 with information about user actions. Such actions may include, for example, adding a connection to another user, sending a message to another user, uploading an image, reading a message from another user, viewing content associated with another user, attending an event posted by another user, among others. In some embodiments, the action logger 1214 receives, subject to one or more privacy settings, content interaction activities associated with a user. In addition, a number of actions described in connection with other objects are directed at particular users, so these actions are associated with those users as well. These actions are stored in the action log 1216.

In accordance with various embodiments, the action logger 1214 is capable of receiving communications from the web server 1222 about user actions on and/or off the social networking system 1202. The action logger 1214 populates the action log 1216 with information about user actions to track them. This information may be subject to privacy settings associated with the user. Any action that a particular user takes with respect to another user is associated with each user's profile, through information maintained in a database or other data repository, e.g., the action log 1216. Such actions may include, for example, adding a connection to the other user, sending a message to the other user, reading a message from the other user, viewing content associated with the other user, attending an event posted by another user, being tagged in photos with another user, liking an entity, etc.

The action log 1216 may be used by the social networking system 1202 to track user actions on the social networking system 1202, as well as external website that communicate information to the social networking system 1202. Users may interact with various objects on the social networking system 1202, including commenting on posts, sharing links, and checking-in to physical locations via a mobile device, accessing content items in a sequence or other interactions. Information describing these actions is stored in the action log 1216. Additional examples of interactions with objects on the social networking system 1202 included in the action log 1216 include commenting on a photo album, communications between users, becoming a fan of a musician, adding an event to a calendar, joining a groups, becoming a fan of a brand page, creating an event, authorizing an application, using an application and engaging in a transaction. Additionally, the action log 1216 records a user's interactions with advertisements on the social networking system 1202 as well as applications operating on the social networking system 1202. In some embodiments, data from the action log 1216 is used to infer interests or preferences of the user, augmenting the interests included in the user profile, and enabling a more complete understanding of user preferences.

Further, user actions that happened in particular context, e.g., when the user was shown or was seen accessing particular content on the social networking system 1202, can be captured along with the particular context and logged. For example, a particular user could be shown/not-shown information regarding candidate users every time the particular user accessed the social networking system 1202 for a fixed period of time. Any actions taken by the user during this period of time are logged along with the context information (i.e., candidate users were provided/not provided to the particular user) and are recorded in the action log 1216. In addition, a number of actions described below in connection with other objects are directed at particular users, so these actions are associated with those users as well.

The action log 1216 may also store user actions taken on external websites services associated with the user. The action log 1216 records data about these users, including viewing histories, advertisements that were engaged, purchases or rentals made, and other patterns from content requests and/or content interactions.

In some embodiments, the edge store 1218 stores the information describing connections between users and other objects on the social networking system 1202 in edge objects. The edge store 1218 can store the social graph described above. Some edges may be defined by users, enabling users to specify their relationships with other users. For example, users may generate edges with other users that parallel the users' real-life relationships, e.g., friends, co-workers, partners, and so forth. Other edges are generated when users interact with objects in the social networking system 1202, e.g., expressing interest in a page or a content item on the social networking system, sharing a link with other users of the social networking system, and commenting on posts made by other users of the social networking system. The edge store 1218 stores edge objects that include information about the edge, e.g., affinity scores for objects, interests, and other users. Affinity scores may be computed by the social networking system 1202 over time to approximate a user's affinity for an object, interest, and other users in the social networking system 1202 based on the actions performed by the user. Multiple interactions of the same type between a user and a specific object may be stored in one edge object in the edge store 1218, in at least one embodiment. In some embodiments, connections between users may be stored in the profile store 1210. In some embodiments, the profile store 1210 may reference or be referenced by the edge store 1218 to determine connections between users. Users may select from predefined types of connections, or define their own connection types as needed.

The web server 1222 links the social networking system 1202 via a network to one or more client devices; the web server 1222 serves web pages, as well as other web-related content, e.g., Java, Flash, XML, and so forth. The web server 1222 may communicate with the message server 1224 that provides the functionality of receiving and routing messages between the social networking system 1202 and client devices. The messages processed by the message server 1224 can be instant messages, email messages, text and SMS (short message service) messages, photos, or any other suitable messaging technique. In some embodiments, a message sent by a user to another user can be viewed by other users of the social networking system 1202, for example, by the connections of the user receiving the message. An example of a type of message that can be viewed by other users of the social networking system besides the recipient of the message is a wall post. In some embodiments, a user can send a private message to another user that can only be retrieved by the other user.

The API request server 1226 enables external systems to access information from the social networking system 1202 by calling APIs. The information provided by the social network may include user profile information or the connection information of users as determined by their individual privacy settings. For example, a system interested in predicting the probability of users forming a connection within a social networking system may send an API request to the social networking system 1202 via a network. The API request server 1226 of the social networking system 1202 receives the API request. The API request server 1226 processes the request by determining the appropriate response, which is then communicated back to the requesting system via a network.

The application service server 1220 can implement at least one application service, for example, one of the application services 102 of FIG. 1. In several embodiments, the social networking system 1202 can include multiple application service servers implementing multiple application services.

The compatibility prediction system 1228 can be the compatibility prediction system 700 of FIG. 7. The compatibility prediction system 1228 can enable developer/analyst users to define, modify, track, execute, compare, analyze, and/or evaluate one or more potential objects for compatibility with other objects by using models generated by running machine learning training and experiments corresponding to one or more application services of the social networking system 1202. The compatibility prediction system 1228 can also enable developer/analyst users to refine machine learning models and to evaluate the efficacy of the machine learning models.

Figure 13:
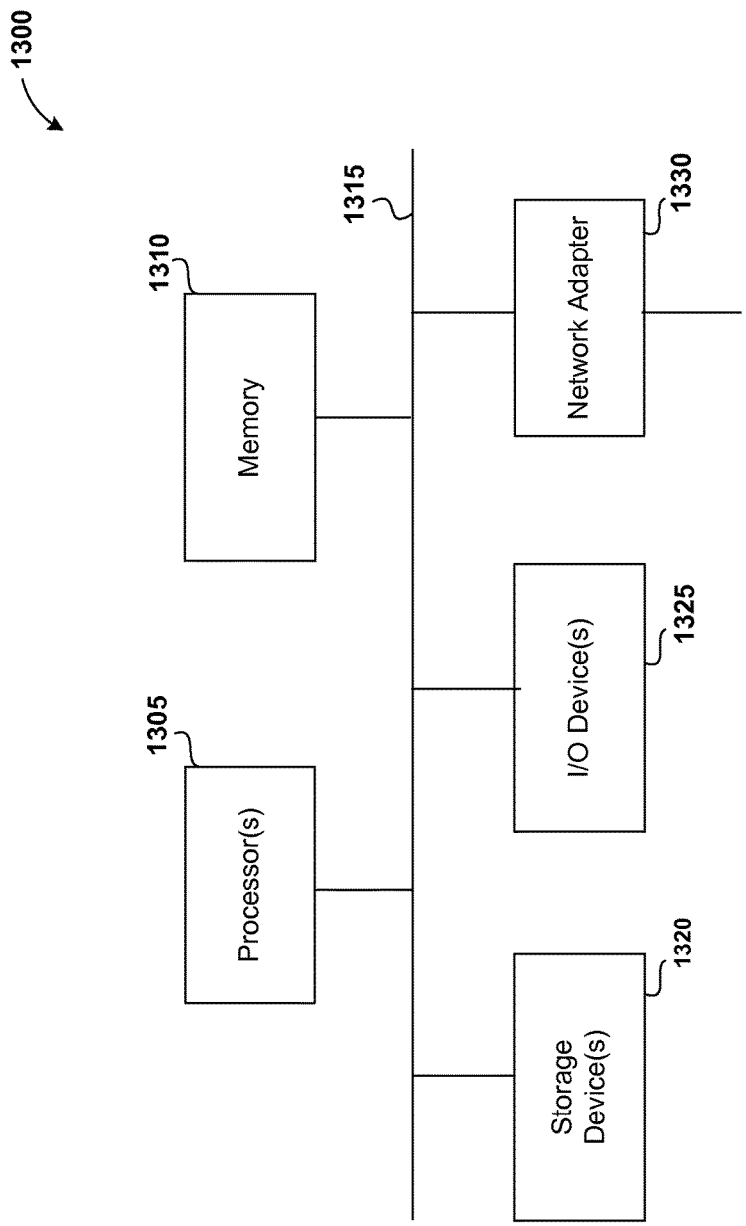
FIG. 13 is a block diagram of an example computing device, which can represent one or more computing devices or servers described here.

FIG. 13 is a block diagram of an example of a computing device 1300, which may represent one or more computing device or server described herein (e.g., the model training system 110 of FIG. 1, the compatibility prediction system 700 of FIG. 7, the social networking system 1202 of FIG. 12, etc.), in accordance with various embodiments. The computing device 1300 includes one or more processors 1305 and memory 1305 coupled to an interconnect 1315. The interconnect 1315 shown in FIG. 13 is an abstraction that represents any one or more separate physical buses, point-to-point connections, or both connected by appropriate bridges, adapters, or controllers. The interconnect 1315, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 1305 is/are the central processing unit (CPU) of the computing device 1300 and thus controls the overall operation of the computing device 1300. In certain embodiments, the processor(s) 1305 accomplishes this by executing software or firmware stored in memory 1310. The processor(s) 1305 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 1310 is or includes the main memory of the computing device 1300. The memory 1310 represents any form of random access memory (RAM), read-only memory (ROM), flash memory, or the like, or a combination of such devices.

Also connected to the processor(s) 1305 through the interconnect 1315 are one or more storage devices 1320, one or more input devices 1325 (e.g., keyboard, mouse, microphone, etc.), and a network adapter 1330. The network adapter 1330 provides the computing device 1300 with the ability to communicate with remote devices, over a network and may be, for example, an Ethernet adapter or Fibre Channel adapter. The network adapter 1330 may also provide the computing device 1300 with the ability to communicate with other computers.

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; and/or optical storage media; flash memory devices), etc.

The term "logic," as used herein, can include, for example, programmable circuitry programmed with specific software and/or firmware, special-purpose hardwired circuitry, or a combination thereof.

Some embodiments of the disclosure have other aspects, elements, features, and steps in addition to or in place of what is described above. These potential additions and replacements are described throughout the rest of the specification. Reference in this specification to "various embodiments" or "some embodiments" means that a particular feature, structure, or characteristic described in connection with the embodiment is included in at least one embodiment of the disclosure. Alternative embodiments (e.g., referenced as "other embodiments") are not mutually exclusive of other embodiments. Moreover, various features are described which may be exhibited by some embodiments and not by others. Similarly, various requirements are described which may be requirements for some embodiments but not other embodiments. Reference in this specification to where a result of an action is "based on" another element or feature means that the result produced by the action can change depending at least on the nature of the other element or feature.

What is claimed is:

1. A computer-implemented method of generating a compatibility score for a grouping of objects based on correlations between attributes of the objects, comprising:
   for each of a plurality of pairs of objects where each pair includes a first object and a second object, receiving a first feature vector of attributes associated with the first object, a second feature vector of attributes associated with the second object, and a label indicative of a correlation between the first and second objects;
   generating multiple datasets by compiling, for each of a plurality of pairs of objects, the first feature vector of attributes, the second feature vector of attributes, and the label into a data structure, wherein each dataset corresponds to one of the plurality of pairs of objects and is a data row of the data structure;
   shuffling the multiple datasets within the data structure into a shuffled order;
   loading the shuffled multiple datasets into a model training system for training a model that generates the compatibility score for a grouping of objects based on correlations between attributes of the objects;
   receiving, by the model training system, the multiple datasets including a first dataset and a second dataset, the first and second datasets received by the model training system in the shuffled order;
   processing each of the first and second datasets in multiple stages to update weight values of a weight matrix, a selected stage of the multiple stages having a set of data independent processing instances that are capable of parallel execution, thereby enabling the selected stage to be multi-threaded in processing the first and second datasets, where the first and second datasets are processed in the shuffled order received by the model training system to reduce a likelihood of collision when updating parameters of the model; and
   generating the compatibility score for the grouping of the first and second objects based on the weight matrix.

2. The computer-implemented method of claim 1, wherein processing each of the first and second datasets in multiple stages comprises:
   at each stage, facilitating passing of an output from at least one of the data processing instances by caching the output in a processing queue for access by another data processing instance as an input for processing in a next stage of the multiple stages;
   wherein the output is associated with any of the first dataset or the second dataset that has finished processing by the at least one data processing instances.

3. The computer-implemented method of claim 1, wherein at least one weight value of the weight matrix is updated based on any of a function of the attributes in the first dataset or a function of the attributes in the second dataset.

4. The computer-implemented method of claim 1, wherein the first object is a user of a social networking server and the second object is an advertisement (ad).

5. The computer-implemented method of claim 4, wherein an attribute of the first object is a demographic datum;
   wherein another attribute of the first object is a targeting keyword associated with the ad; and
   wherein a first correlation is whether the user with the demographic datum has had an interaction with the targeting keyword associated with the ad.

6. The computer-implemented method of claim 4, wherein an attribute of the second object is a page like;
   wherein another attribute of the second object is an object ID associated with the ad; and
   wherein a second correlation is whether the user with the page like has had an interaction with the object ID associated with the ad.

7. The computer-implemented method of claim 4, wherein an attribute of the first object comprises any of demographic data, page likes, installed apps, or visited pixels; and
   wherein another attribute of the first object comprises any of targeting keywords or object IDs associated with the ad.

8. The computer-implemented method of claim 1, wherein the label is a binary value.

9. The computer-implemented method of claim 1, wherein the label is a real value specifying a level of correlation between the first and second objects.

10. A system for training a model structure for compatibility prediction between objects, comprising:
    a first engine having a first set of processors configured to concurrently process multiple datasets, each dataset associated with a first and second objects, each individual dataset of the multiple datasets including a first attribute associated with the first object, a second attribute associated with the second object, and a label indicative of a correlation between the first and second objects, at least some of the first set of processors configured to generate a resulting output corresponding to a respective individual dataset processed by a processor; and
    a second engine having a second set of processors configured to:
       generate a scoring function for determining a compatibility score between the first and second objects based on the multiple datasets; and
       update weight values of a weight set associated with the scoring function for determining the compatibility score between the first and second objects based on the multiple datasets;
    wherein the multiple datasets are shuffled prior to being loaded into the first engine;
    wherein the second set of processors is further configured to update the weight values concurrently by processing resulting outputs from the first set of processors in the shuffled order loaded into the first engine to reduce a likelihood of collision when updating parameters of the model structure;
    wherein any one resulting output is capable of being processed by any one processor of the second set of processors.

11. The system of claim 10,
    wherein the first engine comprises a loader engine, a parser engine, and a dictionary engine; and
    wherein the first set of processors comprises a first subset of processors, a second subset of processors, and a third subset of processors, the first subset of processors corresponding to the loader engine, the second subset of processors corresponding to the parser engine, and the third subset of processors corresponding to the dictionary engine.

12. The system of claim 11, wherein the first subset of processors of the loader engine is configured to:
load the multiple datasets from a data warehouse into the system in parallel; and
store individual datasets of the multiple datasets in a first processing queue for accessing by the second subset of processors.

13. The system of claim 12, wherein the second subset of processors of the parser engine is configured to:
retrieve, in parallel, the individual datasets from the first processing queue; and parse, in parallel, the individual datasets for generating a data structure;
wherein any individual dataset is capable of being retrieved, parsed, or stored by any one processor of the second subset of processors;
wherein the data structure is stored in a second processing queue.

14. The system of claim 13, wherein the third subset of processors of the dictionary engine is configured to:
retrieve, in parallel, individual data instances of the data structure from the second processing queue; and
map, in parallel, the individual data instances to dense representations of the first object and the second object, respectively;
wherein any one individual data instance is capable of being mapped by any one processor of the third subset of processors;
wherein the dense representations are stored in a third processing queue.

15. The system of claim 10,
wherein the second engine comprises a learning engine and an evaluation engine; and
wherein the second set of processors comprises a fourth subset of processors and a fifth subset of processors, the fourth subset of processors corresponding to the learning engine and the fifth subset of processors corresponding to the evaluation engine.

16. The system of claim 15,
wherein the fourth subset of processors of the learning engine is configured to:
to compute a gradient associated with the multiple datasets, wherein the gradient is computed as a function of attributes corresponding to the first and second objects, respectively;
to update the weight values of the weight set associated with the compatibility score based on the gradient, wherein the scoring function is a function of the weight values; and
wherein the fifth subset of processors of the evaluation engine is configured to:
to evaluate computational losses associated with the scoring function; and
to generate the compatibility score using the scoring function with the computational losses.

17. A computer server system, comprising:
a processor;
a memory storage device having executable instructions to cause the processor to implement:
a training interface configured to receive multiple datasets concurrently, each dataset including a first feature vector of attributes associated with a first object, a second feature vector of attributes associated with a second object, and a label indicative of a correlation between the first and second objects; and
a model training system for training a model structure configured to:
set initial parameters of a scoring function;
shuffle the multiple datasets to reduce the probability of a collision when updating parameters of the scoring function;
iterate, using the scoring function, through the multiple datasets concurrently for updating weight values of a weight matrix associated with the attributes corresponding to the first and second feature vectors, the multiple datasets processed in the shuffled order to reduce a likelihood of collision when updating parameters of the model structure; and
generate a compatibility score between the first object and the second object based on the weight matrix;
wherein the first feature vector of attributes is a different type from the second feature vector of attributes.

18. The computer server system of claim 17, wherein the executable instructions further comprise instructions to implement:
a production interface configured to receive a third feature vector of attributes associated with a query object, wherein a compatible object corresponding to the query object is unknown to the computer server system;
a production engine configured to:
analyze the third feature vector of attributes to identify the first object as a correlated object having substantially similar attributes based on a comparison of the first feature vector and the third feature vector;
responsive to the first object having the substantially similar attributes,
identify the second object as the compatible object for the query object based on the compatibility score between the first object and the second object, and
outputting the second object for presentation via the production interface.

19. The computer server system of claim 17, wherein the executable instructions further comprise instructions to implement:
a production interface configured to receive a third feature vector of attributes associated with a query object, wherein a compatible object corresponding to the query object is unknown to the computer server system;
a production engine configured to:
analyze the third feature vector of attributes to identify the first object as a correlated object having substantially similar attributes based on a comparison of the first feature vector and the third feature vector;
responsive to the first object having the substantially similar attributes,
identify a set of potential objects as potential compatible objects for the query object based on a set of compatibility scores, each compatibility score corresponding to a particular compatibility score generated for the first object and each of the set of potential objects, and
rank the set of potential objects based on the set of compatibility scores.

* * * * *